US011715959B2

(12) United States Patent
Qu et al.

(10) Patent No.: US 11,715,959 B2
(45) Date of Patent: Aug. 1, 2023

(54) VOLTAGE CONVERSION CIRCUIT AND POWER SUPPLY SYSTEM

(71) Applicant: Huawei Digital Power Technologies Co., Ltd., Shenzhen (CN)

(72) Inventors: Wanyuan Qu, Hangzhou (CN); Fangcheng Liu, Shanghai (CN); Lei Shi, Shanghai (CN); Wuhua Li, Hangzhou (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/686,163

(22) Filed: Mar. 3, 2022

(65) Prior Publication Data

US 2022/0285947 A1   Sep. 8, 2022

(30) Foreign Application Priority Data

Mar. 3, 2021   (CN) .......................... 202110234843.8

(51) Int. Cl.
*H02J 3/38* (2006.01)
*H02M 1/00* (2006.01)
*H02M 3/156* (2006.01)

(52) U.S. Cl.
CPC ........... *H02J 3/381* (2013.01); *H02M 1/0095* (2021.05); *H02M 3/156* (2013.01); *H02J 2300/26* (2020.01)

(58) Field of Classification Search
None
See application file for complete search history.

(56) References Cited

U.S. PATENT DOCUMENTS

| | | | | |
|---|---|---|---|---|
| 8,773,082 B2 * | 7/2014 | Urakabe | ............. | H02M 7/4837 |
| | | | | 323/225 |
| 9,007,042 B2 * | 4/2015 | Okuda | ...................... | G05F 5/00 |
| | | | | 323/271 |
| 9,812,984 B2 * | 11/2017 | Yoscovich | ................ | H02J 3/38 |
| 10,038,365 B2 * | 7/2018 | Zhak | ........................ | H02M 1/14 |
| 10,050,515 B1 * | 8/2018 | Chakraborty | ....... | H02M 3/1588 |
| 10,063,147 B2 * | 8/2018 | Høyerby | ................. | H02M 3/07 |

(Continued)

FOREIGN PATENT DOCUMENTS

| | | |
|---|---|---|
| CN | 102801350 A | 11/2012 |
| CN | 106230253 A | 12/2016 |

(Continued)

*Primary Examiner* — Jeffery S Zweizig
(74) *Attorney, Agent, or Firm* — Leydig, Voit & Mayer, Ltd.

(57) ABSTRACT

A voltage conversion circuit includes: an inductor, a first switch module, N second switch modules connected in series, N third switch modules connected in series, and N−1 flying capacitors. One terminal of the first switch module is separately connected to one terminal of the N second switch modules connected in series and one terminal of the N third switch modules connected in series. The other terminal of the N third switch modules connected in series is connected to a positive electrode of a high-voltage power supply. The other terminal of the first switch module and the other terminal of the N second switch modules connected in series are connected to a negative electrode of the high-voltage power supply. A low-voltage power supply is connected to the two terminals of the first switch module through the inductor.

20 Claims, 18 Drawing Sheets

(56) References Cited

U.S. PATENT DOCUMENTS

| | | | |
|---|---|---|---|
| 10,404,175 B2* | 9/2019 | Chakraborty | H02M 3/158 |
| 10,581,312 B2 | 3/2020 | Ramadass et al. | |
| 10,734,898 B1 | 8/2020 | Arnold et al. | |
| 11,228,256 B2* | 1/2022 | Zilio | H02M 7/4837 |
| 11,515,709 B2* | 11/2022 | Mao | H02J 3/388 |
| 2019/0341845 A1 | 11/2019 | Woo | |

FOREIGN PATENT DOCUMENTS

| | | |
|---|---|---|
| CN | 108923632 A | 11/2018 |
| CN | 109004832 A | 12/2018 |
| CN | 110429815 A | 11/2019 |
| CN | 111277131 A | 6/2020 |
| CN | 112953202 A | 6/2021 |
| JP | 2005224060 A | 8/2005 |
| WO | 2011089483 A1 | 7/2011 |
| WO | 2014011706 A1 | 1/2014 |

\* cited by examiner

VOLTAGE CONVERSION CIRCUIT AND POWER SUPPLY SYSTEM

CROSS-REFERENCE TO RELATED APPLICATION

This application claims priority to Chinese Patent Application No. 202110234843.8, filed on Mar. 3, 2021, which is hereby incorporated by reference in its entirety.

TECHNICAL FIELD

Embodiments of this application relate to voltage conversion technologies, and in particular, to a voltage conversion circuit and a power supply system.

BACKGROUND

A direct current-direct current (DC-DC) voltage conversion circuit is a circuit that performs voltage conversion on a direct current. Common DC-DC voltage conversion circuits include a buck DC-DC voltage conversion circuit, a boost DC-DC voltage conversion circuit, a buck-boost DC-DC voltage conversion circuit, and the like. The DC-DC voltage conversion circuit is widely used in a new energy power supply system or power supply device that has a direct current characteristic, for example, a photovoltaic power generation system, a battery, or a fuel cell.

A photovoltaic power generation system that provides an alternating current for a load is used as an example. A direct current generated by each photovoltaic string in the photovoltaic power generation system is boosted by using a corresponding DC-DC voltage conversion circuit, a boosted direct current is converged on a direct current bus side, an inverter converts a converged direct current into an alternating current, and the alternating current is output to an alternating current load. Because a voltage difference between an output voltage of a photovoltaic component and a voltage of a direct current bus is large, currently, dozens of photovoltaic components are connected in series in one photovoltaic string in the photovoltaic power generation system, to increase a voltage of a direct current output by the photovoltaic string. Then, the voltage of the direct current output by the photovoltaic string is further increased by using a boost DC-DC voltage conversion circuit, so that a voltage of a boosted direct current matches the voltage of the direct current bus.

However, according to the manner in which dozens of photovoltaic components are connected in series in one photovoltaic string, a probability that a consistency problem occurs in the photovoltaic string increases. Consequently, a risk caused by inconsistency is increased. In addition, a probability that the photovoltaic components in the photovoltaic string fail also increases. Consequently, reliability of the photovoltaic string is reduced.

SUMMARY

Embodiments of this application provide a voltage conversion circuit and a power supply system, to implement a high boost ratio.

According to a first aspect, this application provides a voltage conversion circuit. The voltage conversion circuit includes: an inductor, a first switch module, N second switch modules connected in series, N third switch modules connected in series, and N−1 flying capacitors.

N is an integer greater than or equal to 2. One terminal of the first switch module is separately connected to one terminal of the N second switch modules connected in series and one terminal of the N third switch modules connected in series. The other terminal of the N third switch modules connected in series is connected to a positive electrode of a high-voltage power supply, and the other terminal of the first switch module and the other terminal of the N second switch modules connected in series are connected to a negative electrode of the high-voltage power supply.

A low-voltage power supply is connected to the two terminals of the first switch module through the inductor. For example, a positive electrode of the low-voltage power supply is connected to one terminal of the first switch module through the inductor, and a negative electrode of the low-voltage power supply is connected to the other terminal of the first switch module. Alternatively, a positive electrode of the low-voltage power supply is connected to one terminal of the first switch module, and a negative electrode of the low-voltage power supply is connected to the other terminal of the first switch module through the inductor.

One terminal of an $i^{th}$ flying capacitor in the N−1 flying capacitors is connected to a connection point between an $i^{th}$ second switch module and an $(i+1)^{th}$ second switch module, the other terminal of the $i^{th}$ flying capacitor is connected to a connection point between an $i^{th}$ third switch module and an $(i+1)$th third switch module, and i is an integer greater than or equal to 1 and less than or equal to N−1.

The voltage conversion circuit may store energy for the inductor and at least one flying capacitor in the voltage conversion circuit, so that the low-voltage power supply, the inductor, and one or more flying capacitors in the at least one flying capacitor jointly discharge to the high-voltage power supply located on an output side, to implement a higher boost ratio. When the voltage conversion circuit is used in a photovoltaic power generation system, a quantity of photovoltaic components connected in series in a photovoltaic string may be reduced, thereby reducing a risk caused by inconsistency and improving reliability of the photovoltaic string.

In addition, in the voltage conversion circuit, the N−1 flying capacitors may be considered as N−1 flying capacitors connected stage by stage. Subsequently, a required stage quantity for the flying capacitors and second switch modules and third switch modules that correspond to the flying capacitors may be adaptively adjusted based on a required boost ratio. To be specific, a higher boost ratio may be implemented by cascading more flying capacitors.

In a possible implementation, in one switching period, the voltage conversion circuit performs, by using the following operation modes, boost conversion on a voltage output by the low-voltage power supply: an inductor charging mode, a flying capacitor charging mode, and a boost discharging mode. In the inductor charging mode, the low-voltage power supply and the inductor form a closed loop, to charge the inductor. In the flying capacitor charging mode, the low-voltage power supply, the inductor, and at least one flying capacitor in the N−1 flying capacitors form a closed loop, to charge the at least one flying capacitor. In the boost discharging mode, the low-voltage power supply, the inductor, one or more flying capacitors in the at least one flying capacitor, and the high-voltage power supply form a closed loop, to discharge to the high-voltage power supply. According to the operation modes, the energy can be stored for the inductor and the at least one flying capacitor in the voltage conversion circuit, so that the low-voltage power supply, the inductor, and the one or more flying capacitors in the at least one flying capacitor jointly discharge to the high-voltage power supply located on the output side, to implement the higher boost ratio.

In a possible implementation, each operation mode occurs at least once in one switching period. To be specific, when each operation mode occurs for a plurality of times in one switching period, that is, when a plurality of same operation modes exist in one switching period, the operation mode may be allocated more evenly, so that current ripples of the inductor or voltage ripples of a capacitor can be reduced in the operation mode.

In a possible implementation, the switching period includes at least one flying capacitor charging mode, and each flying capacitor charging mode is used to charge the at least one flying capacitor in the N−1 flying capacitors. In the boost discharging mode, the low-voltage power supply, the inductor, the at least one flying capacitor, and the high-voltage power supply form a closed loop, to discharge to the high-voltage power supply. It should be understood that if the at least one flying capacitor includes a plurality of flying capacitors, the plurality of flying capacitors are connected in parallel in each flying capacitor charging mode and the boost discharging mode.

In a possible implementation, a quantity of flying capacitors included in the at least one flying capacitor is positively correlated with a magnitude of a current output by the low-voltage power supply. According to the manner, when the current output by the low-voltage power supply is small, fewer flying capacitors can be used in the voltage conversion circuit to participate in charging and discharging. In this way, a capacitance value after the flying capacitors that participate in charging and discharging are equivalent to one flying capacitor is small, so that a change in a voltage magnitude of the flying capacitor is great. Therefore, a speed of boost conversion of the voltage conversion circuit is higher (namely, a faster response). When the current output by the low-voltage power supply is large, more flying capacitors are used in the voltage conversion circuit to participate in charging and discharging. In this way, a capacitance value after the flying capacitors that participate in charging and discharging are equivalent to one flying capacitor is large, so that a change in a voltage magnitude of the flying capacitor is minor (or a voltage fluctuation is slight). Therefore, stability of a device or system in which the voltage conversion circuit is used is higher.

In a possible implementation, capacitance values of the N−1 flying capacitors are increased stage by stage. The one switching period includes a plurality of flying capacitor charging modes, and the plurality of flying capacitor charging modes are used to charge a plurality of flying capacitors in the N−1 flying capacitors stage by stage. Each flying capacitor charging mode is used to charge one flying capacitor in the plurality of flying capacitors. In the boost discharging mode, the low-voltage power supply, the inductor, a last-stage flying capacitor in the plurality of flying capacitors, and the high-voltage power supply form a closed loop, to discharge to the high-voltage power supply. According to the manner in which the flying capacitors are charged stage by stage, a voltage can be gradually increased, to implement the higher boost ratio.

In a possible implementation, a quantity of the plurality of flying capacitors is related to a boost ratio of the voltage conversion circuit. According to the manner, the voltage conversion circuit can adapt to devices or systems with different boost ratios.

According to a second aspect, this application provides a voltage conversion circuit. The voltage conversion circuit includes: an inductor, a first switch module, two second switch modules connected in series, two third switch modules connected in series, and a flying capacitor.

One terminal of the first switch module is separately connected to one terminal of the two second switch modules connected in series and one terminal of the two third switch modules connected in series. The other terminal of the two third switch modules connected in series is connected to a positive electrode of a high-voltage power supply, and the other terminal of the first switch module and the other terminal of the two second switch modules connected in series are connected to a negative electrode of the high-voltage power supply.

A low-voltage power supply is connected to the two terminals of the first switch module through the inductor. For example, a positive electrode of the low-voltage power supply is connected to one terminal of the first switch module through the inductor, and a negative electrode of the low-voltage power supply is connected to the other terminal of the first switch module. Alternatively, a positive electrode of the low-voltage power supply is connected to one terminal of the first switch module, and a negative electrode of the low-voltage power supply is connected to the other terminal of the first switch module through the inductor.

One terminal of the flying capacitor is connected to a connection point between a first second switch module and a second switch module, and the other terminal of the flying capacitor is connected to a connection point between a first third switch module and a second third switch module.

The voltage conversion circuit may store energy for the inductor and the flying capacitor in the voltage conversion circuit, so that the low-voltage power supply, the inductor, and the flying capacitor jointly discharge to the high-voltage power supply located on an output side, to implement a higher boost ratio. When the voltage conversion circuit is used in a photovoltaic power generation system, a quantity of photovoltaic components connected in series in a photovoltaic string may be reduced, thereby reducing a risk caused by inconsistency and improving reliability of the photovoltaic string.

In a possible implementation, in one switching period, the voltage conversion circuit performs, by using the following operation modes, boost conversion on a voltage output by the low-voltage power supply: an inductor charging mode, a flying capacitor charging mode, and a boost discharging mode. In the inductor charging mode, the low-voltage power supply and the inductor form a closed loop, to charge the inductor. In the flying capacitor charging mode, the low-voltage power supply, the inductor, and the flying capacitor form a closed loop, to charge the flying capacitor. In the boost discharging mode, the low-voltage power supply, the inductor, the flying capacitor, and the high-voltage power supply form a closed loop, to discharge to the high-voltage power supply.

According to the operation modes, the energy can be stored for the inductor and the flying capacitor in the voltage conversion circuit, so that the low-voltage power supply, the inductor, and the flying capacitor jointly discharge to the high-voltage power supply located on the output side, to implement the higher boost ratio.

In a possible implementation, each operation mode occurs at least once in one switching period. To be specific, when each operation mode occurs for a plurality of times in one switching period, that is, when a plurality of same operation modes exist in one switching period, the operation mode may be allocated more evenly, so that current ripples of the inductor or voltage ripples of a capacitor can be reduced in the operation mode.

According to a third aspect, this application provides a power supply system. The power supply system includes a plurality of power generation units and a high-voltage power supply. Each power generation unit includes a low-voltage power supply and the voltage conversion circuit provided in the first aspect or any possible implementation of the first aspect.

In a possible implementation, the low-voltage power supply is a photovoltaic string, and the high-voltage power supply is a direct current bus. The power supply system further includes an inverter. A positive electrode of the direct current bus is connected to a first input terminal of the inverter, a negative electrode of the direct current bus is connected to a second input terminal of the inverter, and an output terminal of the inverter is connected to an alternating current load.

In a possible implementation, the low-voltage power supply is a photovoltaic string, and the high-voltage power supply is a direct current load.

For a connection relationship among the low-voltage power supply, the high-voltage power supply, and the voltage conversion circuit, and corresponding technical effects, refer to the descriptions of the first aspect and any possible implementation of the first aspect. Details are not described herein again.

DETAILED DESCRIPTION

Currently, there are two common photovoltaic power generation systems: a photovoltaic power generation system that provides an alternating current for a load, and a photovoltaic power generation system that provides a direct current for a load. The following briefly describes the two systems.

Figure 1:
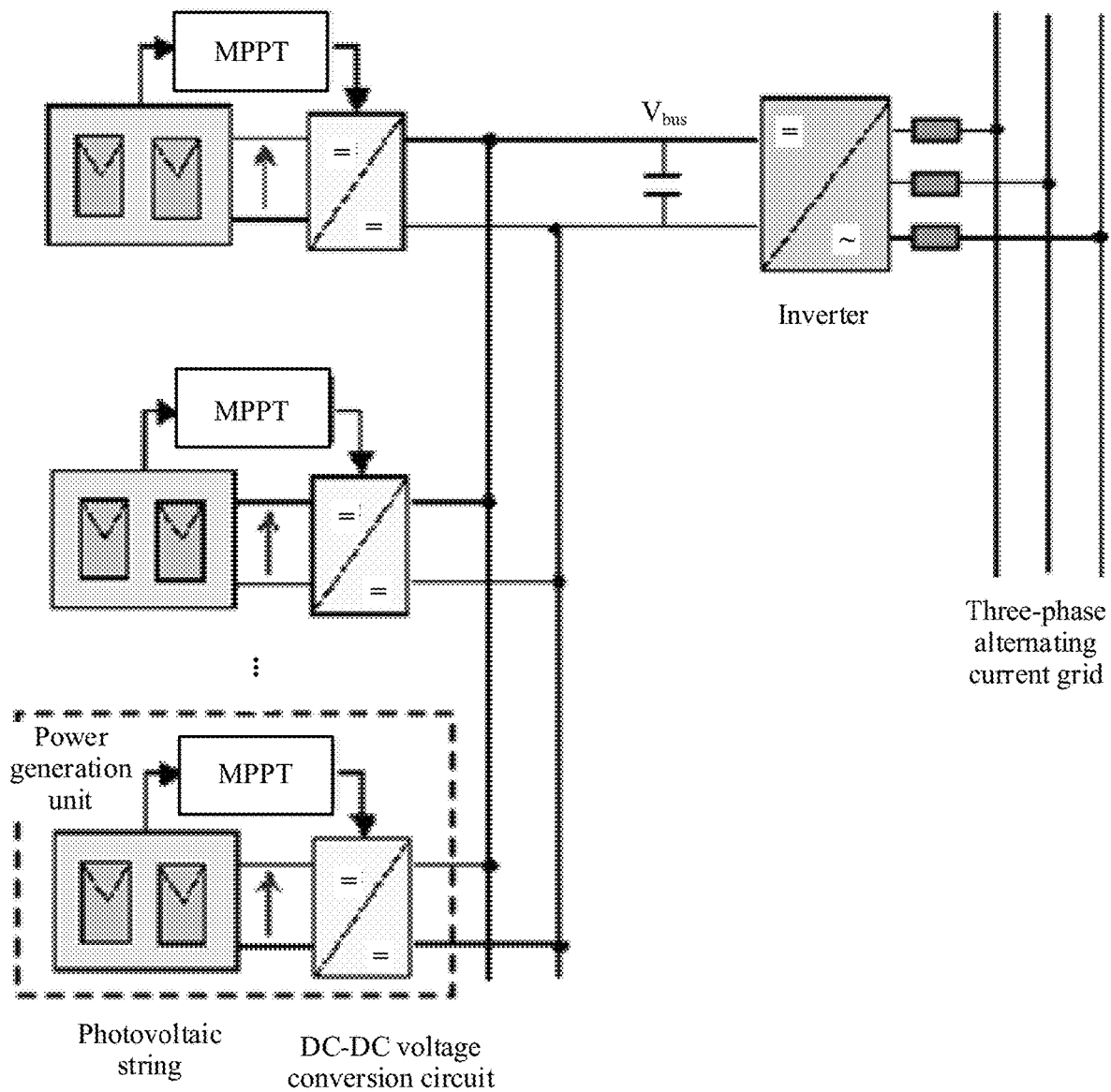
FIG. 1 is a schematic diagram of a photovoltaic power generation system applied to an embodiment of this application.

FIG. 1 is a schematic diagram of a photovoltaic power generation system applied to an embodiment of this application. As shown in FIG. 1, a photovoltaic power generation system that provides an alternating current for a load may include a plurality of power generation units, a direct current bus, and an inverter. One power generation unit includes a photovoltaic string and a DC-DC voltage conversion circuit. Optionally, in some embodiments, the power generation unit may further include a maximum power point tracking (MPPT) control circuit. FIG. 1 is a schematic diagram of an example in which the MPPT control circuit is included.

In the example in which the MPPT control circuit is included, a photovoltaic string in each power generation unit generates a direct current, MPPT is performed on the direct current by using the MPPT control circuit, a direct current obtained through MPPT is boosted by using the DC-DC voltage conversion circuit, a boosted direct current is converged on the direct current bus side, and the direct current bus filters the converged direct current output by the power generation unit, to obtain a stable direct current. Finally, the inverter converts the stable direct current into an alternating current, and outputs the alternating current to an alternating current load, to supply power to the alternating current load.

The alternating current load described herein may be any device or system that uses an alternating current. FIG. 1 is a schematic diagram of an example in which a three-phase alternating current grid (3-phase AC grid) is used as an alternating current load.

Figure 2:
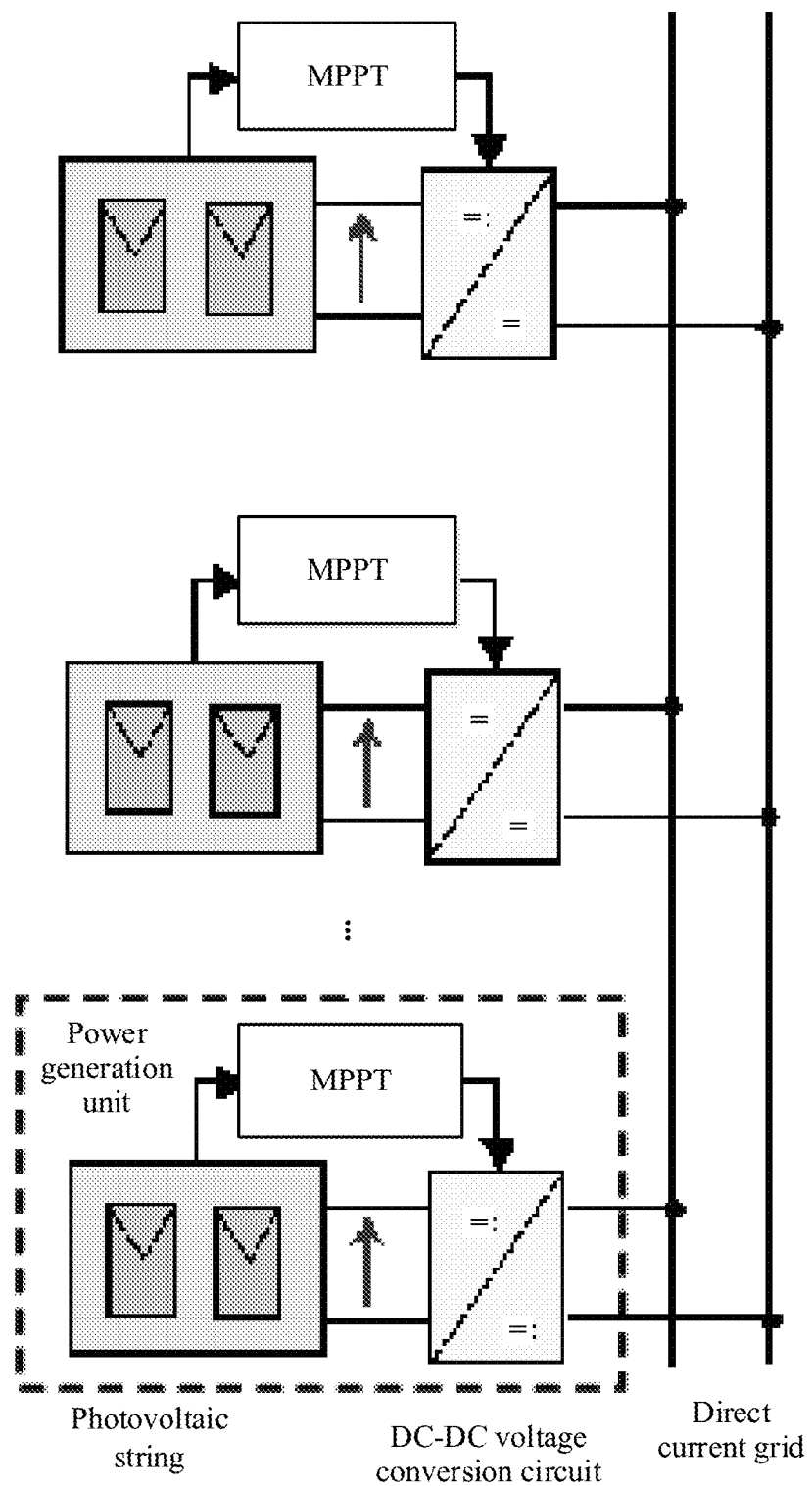
FIG. 2 is a schematic diagram of another photovoltaic power generation system applied to an embodiment of this application.

FIG. 2 is a schematic diagram of another photovoltaic power generation system applied to an embodiment of this application. As shown in FIG. 2, a photovoltaic power generation system that provides a direct current for a load may include a plurality of power generation units. One power generation unit includes, for example, a photovoltaic string and a DC-DC voltage conversion circuit. Optionally, in some embodiments, the power generation unit may further include an MPPT control circuit. FIG. 2 is a schematic diagram of an example in which the MPPT control circuit is included.

In the example in which the MPPT control circuit is included, a photovoltaic string in each power generation unit generates a direct current, MPPT is performed on the direct current by using the MPPT control circuit, a direct current obtained through MPPT is boosted by using the DC-DC voltage conversion circuit, and a boosted direct current is directly provided to a direct current load, to supply power to the direct current load. The direct current load described herein may be any device or system that uses a direct current, for example, a direct current grid or a direct current power transmission and distribution system bus. FIG. 2 is a schematic diagram of an example in which the direct current grid is used as a direct current load. Subsequently, for ease of description, the direct current bus connected to the DC-DC voltage conversion circuit in FIG. 1 and the direct current load connected to the DC-DC voltage conversion circuit in FIG. 2 are collectively referred to as a high-voltage power supply.

Figure 3:
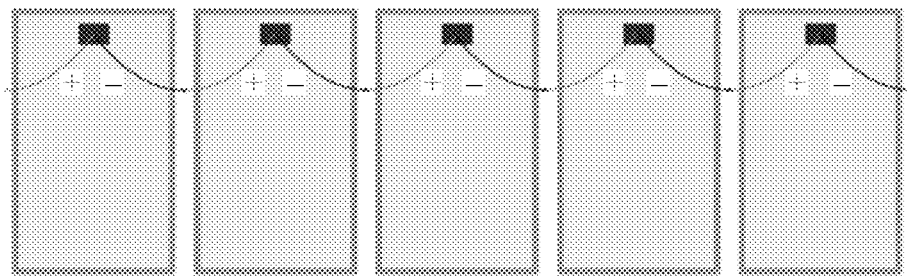
FIG. 3 is a schematic diagram of a photovoltaic string in a power generation unit.

The photovoltaic power generation system shown in FIG. 1 is used as an example. FIG. 3 is a schematic diagram of a photovoltaic string in a power generation unit. As shown in FIG. 3, one photovoltaic string includes a plurality of photovoltaic components connected in series. The photovoltaic component described herein is a power generation apparatus that generates a direct current when being exposed to sunlight, and generally includes a thin solid photovoltaic battery made of a semiconductor material (for example, silicon).

However, a voltage difference between an output voltage of the photovoltaic component and a voltage Vbus of the direct current bus is large, for example, the output voltage of the photovoltaic component is usually between 30 V and 50 V, and the voltage Vbus of the direct current bus is usually between 800 V and 1500 V. Currently, to match the output voltage of the photovoltaic string with the voltage Vbus of the direct current bus, dozens of photovoltaic components are connected in series in one photovoltaic string, to increase a voltage of a direct current output by the photovoltaic string, and then the voltage of the direct current output by the photovoltaic string is further increased by using a boost DC-DC voltage conversion circuit, so that a voltage of a boosted direct current can match the voltage Vbus of the direct current bus.

According to the manner in which dozens of photovoltaic components are connected in series, the problem that the output voltage of the photovoltaic string does not match the voltage of the direct current bus can be resolved. However, a new problem is caused because dozens of photovoltaic components are connected in series in one photovoltaic string.

Specifically, when a plurality of photovoltaic components are connected in series to form one photovoltaic string, the plurality of photovoltaic components meet a "cask principle". To be specific, a current capability (namely, a magnitude of a current) of the worst photovoltaic component in the string determines a current flowing capability of the entire photovoltaic string. Therefore, the photovoltaic components in one photovoltaic string need to be consistent, to ensure a capability of the string. However, affected by one or more factors such as production and manufacturing, transportation and installation, and an external environment in which the photovoltaic power generation system is located, a current flowing capability of one or more photovoltaic components in the photovoltaic string may be reduced. This causes a consistency problem in the photovoltaic string, and further causes the current flowing capability of the entire photovoltaic string to be degraded.

When more photovoltaic components are connected in series in one photovoltaic string, a probability that the consistency problem occurs is higher. Consequently, according to the manner in which dozens of photovoltaic components are connected in series in one photovoltaic string, a probability that a consistency problem occurs in the photovoltaic string increases. Consequently, a risk caused by inconsistency is increased. In addition, a probability that the photovoltaic components in the photovoltaic string fail also increases. Consequently, reliability of the photovoltaic string is reduced.

Similarly, a similar problem exists in the photovoltaic power generation system shown in FIG. 2.

It can be learned from structures of the photovoltaic power generation systems shown in FIG. 1 and FIG. 2 that a boost DC-DC voltage conversion circuit with a high boost ratio may be used, to match the output voltage of the photovoltaic string with the voltage of the high-voltage power supply when a quantity of photovoltaic components connected in series is reduced.

Currently, there are two types of commonly used boost DC-DC voltage conversion circuits.

The first type is a boost conversion circuit.

Figure 4:
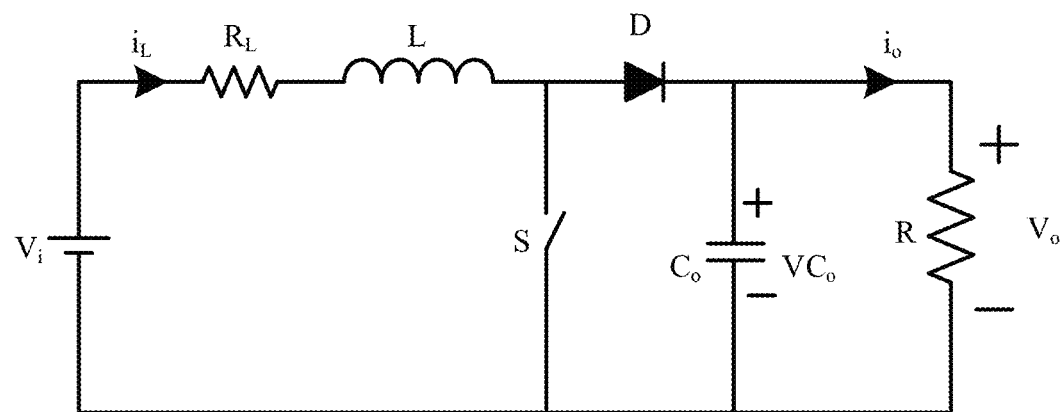
FIG. 4 is a schematic diagram of a structure of an existing boost conversion circuit.

FIG. 4 is a schematic diagram of a structure of an existing boost conversion circuit. As shown in FIG. 4, the boost conversion circuit includes an inductor L, a diode D, a switch S, and an output capacitor $C_o$. One terminal of the boost conversion circuit is connected to an input power supply $V_i$, and one terminal of the boost conversion circuit is connected to a load R.

An operation principle of the boost conversion circuit is as follows: When the switch S is closed, the input power supply $V_i$ charges the inductor L. When the switch S is disconnected, the diode D is turned on, and the input power supply $V_i$ and the inductor L are connected in series, to jointly provide an output voltage $V_o$ to the load R.

According to a volt-second balance principle of energy of the inductor L, an output voltage of the input power supply $V_i$ can match a required voltage for the load R. Volt-second balance described herein means that a volt-second quantity of an on time (a current increasing segment) of the switch in the boost conversion circuit is equal to a volt-second quantity of an off time (a current decreasing segment) of the switch in value, so that positive volt-second values at two terminals of the inductor that operates in a stable state are equal to a negative volt-second value.

A boost ratio $$\frac{V_{out}}{V_{in}}$$

of the boost conversion circuit in a continuous conduction mode (CCM) is shown in the following formula (1):

$$\frac{V_{out}}{V_{in}} = \frac{1}{1-D} \qquad (1)$$

$V_{out}$ represents an output voltage of the boost conversion circuit, namely, a voltage output by the boost conversion circuit to the load R. $V_{in}$ represents an input voltage of the boost conversion circuit, namely, a voltage input by the input power supply $V_i$ to the boost conversion circuit. D represents a duty cycle of the switch S.

It can be learned from the formula (1) that the boost ratio of the boost conversion circuit is limited. When the boost conversion circuit is used in the foregoing photovoltaic power generation systems, the boost conversion circuit cannot be used, to match the output voltage of the photovoltaic string with the voltage of the high-voltage power supply without increasing the quantity of the photovoltaic components connected in series.

The second type is a flyback circuit.

Figure 5:
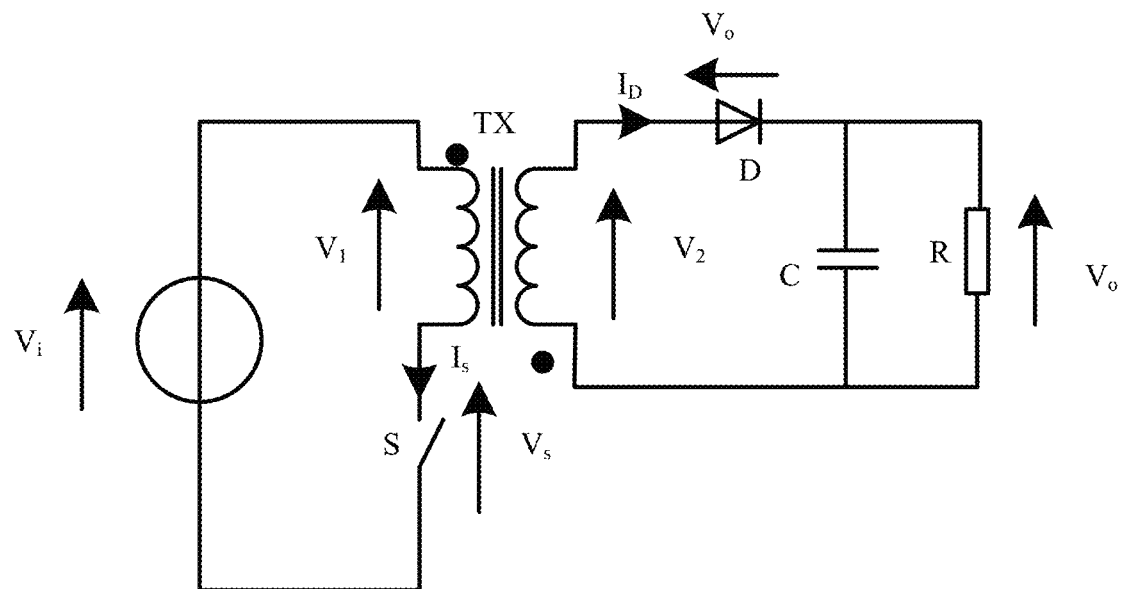
FIG. 5 is a schematic diagram of a structure of an existing flyback circuit.

FIG. 5 is a schematic diagram of a structure of an existing flyback circuit. As shown in FIG. 5, the flyback circuit includes a transformer TX, a switch S, a diode D, and an output capacitor C. One terminal of the flyback circuit is connected to an input power supply $V_i$, and one terminal of the flyback circuit is connected to a load R.

An operation principle of the flyback circuit is as follows: When the switch S is closed, the input power supply $V_i$ charges the transformer TX. When the switch S is disconnected, an output voltage $V_o$ is provided for the load R through the diode D by using energy stored in the transformer TX. A boost ratio of the flyback circuit may be changed by adjusting a ratio of turns of a primary side to turns of a secondary side of the transformer TX, so that an output voltage of the input power supply $V_i$ matches a required voltage for the load R.

A boost ratio $$\frac{V_{out}}{V_{in}}$$

of the flyback circuit in a continuous conduction mode is shown in the following formula (2):

$$\frac{V_{out}}{V_{in}} = \frac{N_2}{N_1} \frac{D}{1-D} \qquad (2)$$

N2/N1 represents the ratio of the turns of the primary side to the turns of the secondary side of the transformer TX.

A high boost ratio of the flyback circuit may be implemented by adjusting the ratio of the turns of the primary side to the turns of the secondary side of the transformer TX, and isolation between an input and an output may also be implemented by using the transformer TX. However, because the transformer has a large volume and a heavy weight, when the flyback circuit is applied to a high-power occasion, the volume and the weight of the transformer lead to an excessively large volume and an excessively heavy weight of the entire system. Therefore, the flyback circuit is usually used in a medium/low-power switching power supply, and cannot be used in a high-power new energy power generation system (which may also be referred to as a renewable energy power generation system), for example, a photovoltaic power generation system.

In conclusion, currently, there is no DC-DC voltage conversion circuit that can be used in the photovoltaic power generation system to match the output voltage of the photovoltaic string with the voltage of the high-voltage power supply without increasing the quantity of the photovoltaic components connected in series.

In view of this, embodiments of this application provide a voltage conversion circuit that can implement a higher boost ratio than a boost conversion circuit without using a transformer. It should be understood that the voltage conversion circuit provided in embodiments of this application may be a boost voltage conversion circuit or a buck-boost voltage conversion circuit. That is, the voltage conversion circuit may be a unidirectional voltage conversion circuit or a bidirectional voltage conversion circuit. To be specific, the voltage conversion circuit may implement conversion from a low voltage to a high voltage, or may implement conversion from a low voltage to a high voltage, and implement conversion from a high voltage to a low voltage.

The voltage conversion circuit may be applied to any scenario in which voltage conversion needs to be performed on a direct current. For example, the voltage conversion circuit may be used in a new energy power supply system or power supply device that has a direct current characteristic, for example, a photovoltaic power generation system, a battery, or a fuel cell, or may be used in another power supply system or power supply device that supplies power by using an energy harvesting technology. The energy harvesting technology described herein is a technology for obtaining energy from an ambient environment of a device. The technology essentially refers to using various physical or chemical effects such as photovoltaic, thermoelectric, piezoelectric, and electromagnetic to convert energy such as light energy, thermal energy, mechanical energy, and wind energy that widely exist in the ambient environment of the device into usable electric energy. For example, when the voltage conversion circuit provided in embodiments of this application is used in a photovoltaic power generation system, an output voltage of a photovoltaic string may match a voltage of a direct current bus when a quantity of photovoltaic components connected in series is reduced and a volume and a weight of the photovoltaic power generation system are not increased, thereby reducing a risk caused by inconsistency and improving reliability of the photovoltaic string.

It should be understood that the power supply system described above may be a power supply system that provides an alternating current for a load or a power supply system that provides a direct current for a load. The power supply device described above may be a power supply device that provides an alternating current for a load or a power supply device that provides a direct current for a load. The photovoltaic power generation system is used as an example. The photovoltaic power generation system may be, for example, the photovoltaic power generation system that provides an alternating current for a load shown in FIG. 1. Alternatively, the photovoltaic power generation system may be, for example, the photovoltaic power generation system that provides a direct current for a load shown in FIG. 2.

The following describes in detail the voltage conversion circuit provided in embodiments of this application with reference to exemplary embodiments. The following several exemplary embodiments may be combined with each other, and a same or similar concept or process may not be described repeatedly in some embodiments. It should be understood that, for another component in a device or system in which the voltage conversion circuit is used, refer to the conventional technology. This is not limited in embodiments of this application. The photovoltaic power generation system is still used as an example. Another component other than the voltage conversion circuit in the photovoltaic power generation system is not limited in embodiments of this application, for example, an existing component may be still used.

Figure 6:
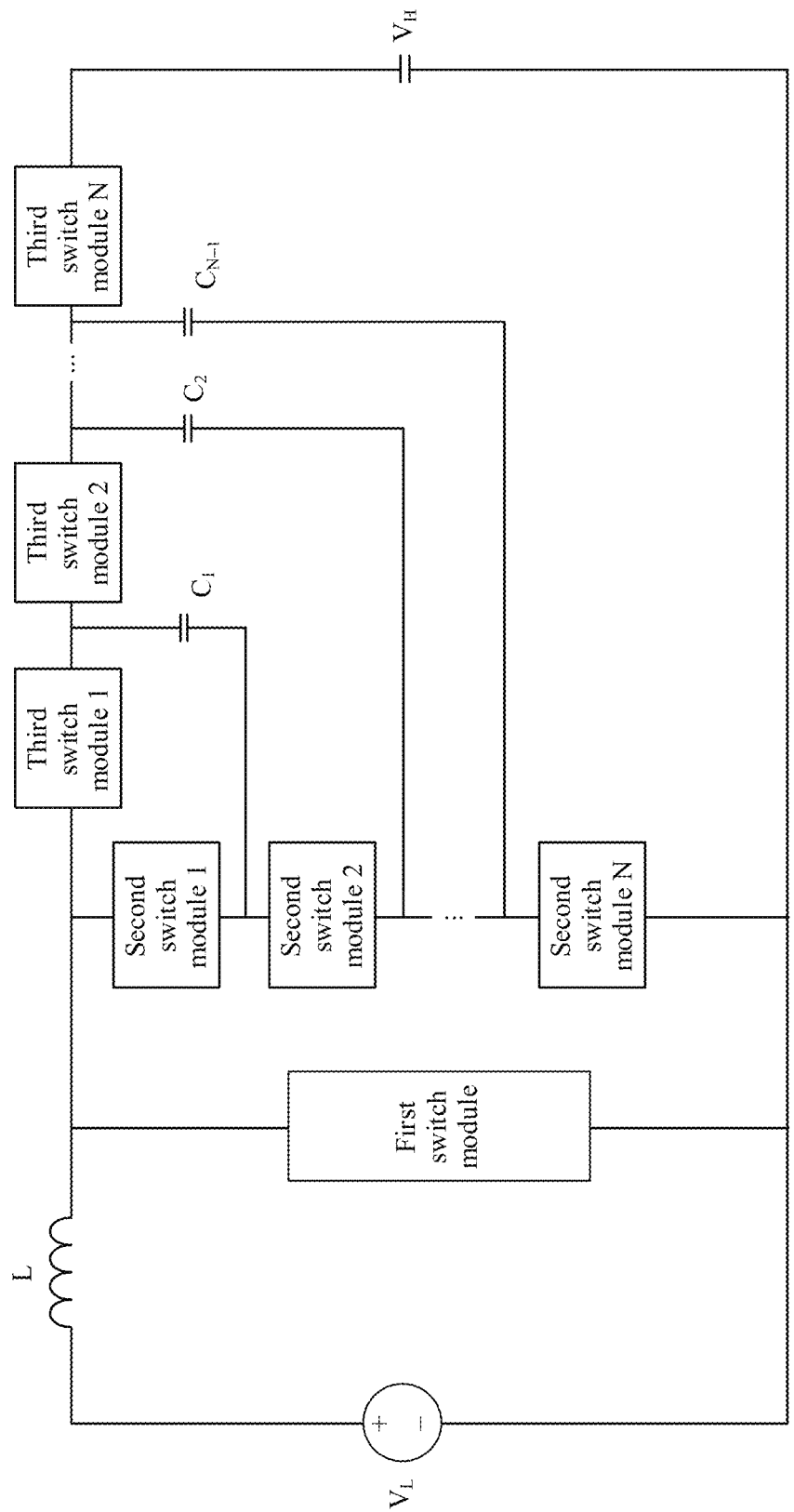
FIG. 6 is a schematic diagram of a structure of a voltage conversion circuit according to an embodiment of this application.

FIG. 6 is a schematic diagram of a structure of a voltage conversion circuit according to an embodiment of this application. As shown in FIG. 6, the voltage conversion circuit includes: an inductor L, a first switch module, N second switch modules connected in series, N third switch modules connected in series, and N−1 flying capacitors, where N is an integer greater than or equal to 2.

One terminal of the voltage conversion circuit is connected to a low-voltage power supply, and one terminal of the voltage conversion circuit is connected to a high-voltage power supply, to increase a voltage of a direct current output by the low-voltage power supply, so that a voltage of a boosted direct current matches a required voltage for the high-voltage power supply. It should be understood that the low-voltage power supply and the high-voltage power supply described herein are distinguished from each other only in terms of voltage value. In exemplary implementation, the low-voltage power supply and the high-voltage power supply may be determined based on a scenario in which the voltage conversion circuit is used. The photovoltaic power generation system shown in FIG. 1 is used as an example, the low-voltage power supply described herein may be, for example, a photovoltaic string, and the high-voltage power supply may be, for example, a direct current bus.

In FIG. 6 and the drawings related to subsequent embodiments, $V_L$ represents a low-voltage power supply, $V_H$ represents a high-voltage power supply, L represents an inductor, and $C_i$ represents an $i^{th}$ flying capacitor. i is an integer greater than or equal to 1 and less than or equal to N−1.

Figure 6A:
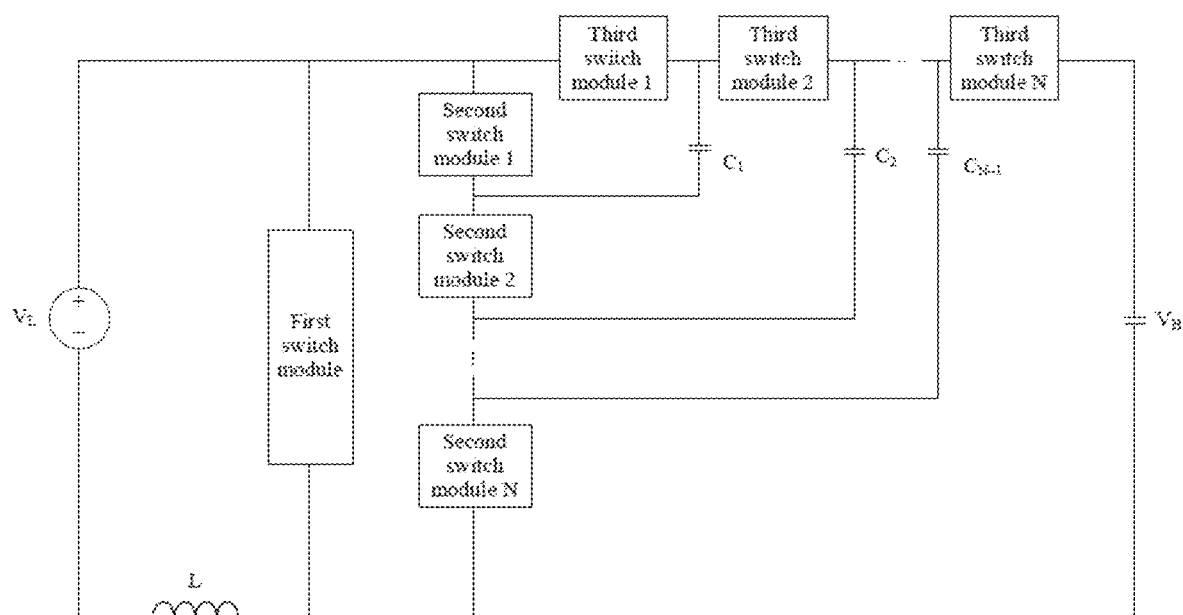
FIG. 6a is a schematic diagram of another structure of a voltage conversion circuit according to an embodiment of this application.

An exemplary connection relationship of the voltage conversion circuit is as follows:

The low-voltage power supply is connected to two terminals of the first switch module through the inductor. For example, a positive electrode of the low-voltage power supply is connected to one terminal of the first switch module through the inductor, and a negative electrode of the low-voltage power supply is connected to the other terminal of the first switch module. To be specific, one terminal of the inductor is connected to the positive electrode of the low-voltage power supply, the other terminal of the inductor is connected to one terminal of the first switch module, and the other terminal of the first switch module is connected to the negative electrode of the low-voltage power supply. Alternatively, as shown in FIG. 6a, a positive electrode of the low-voltage power supply is connected to one terminal of the first switch module, and a negative electrode of the low-voltage power supply is connected to the other terminal of the first switch module through the inductor. To be specific, one terminal of the inductor is connected to the negative electrode of the low-voltage power supply, and the other terminal of the inductor is connected to the other terminal of the first switch module.

In other words, the inductor is connected to the positive or negative electrode of the low-voltage power supply, so that the low-voltage power supply, the inductor, and the first switch module can form a serial loop. For ease of description, an example in which the inductor is connected to the positive electrode of the low-voltage power supply is used for description in FIG. 6 and the drawings related to subsequent embodiments.

One terminal of the first switch module is connected to one terminal of the N second switch modules connected in series, and the other terminal of the first switch module is connected to the other terminal of the N second switch modules connected in series. That is, the N second switch modules connected in series are connected in parallel to the first switch module.

One terminal of the first switch module is connected to one terminal of the N third switch modules connected in series, the other terminal of the N third switch modules connected in series is connected to a positive electrode of the high-voltage power supply, and a negative electrode of the high-voltage power supply is connected to the other terminal of the first switch module, so that the low-voltage power supply, the inductor, the N third switch modules, and the high-voltage power supply form a serial loop.

One terminal of an $i^{th}$ flying capacitor $C_i$ in the N−1 flying capacitors is connected to "a connection point between an $i^{th}$ second switch module (a second switch module i for short) and an $(i+1)^{th}$ second switch module (a second switch module i+1 for short)", and the other terminal of the flying capacitor $C_i$ is connected to "a connection point between an $i^{th}$ third switch module (a third switch module i for short) and an $(i+1)^{th}$ third switch module (a third switch module i+1 for short)".

It may be understood that a quantity of the second switch modules and a quantity of the third switch modules in this embodiment of this application are related to a quantity of the flying capacitors included in the circuit. However, a quantity of flying capacitors used in the voltage conversion circuit to participate in a charging and boost discharging operation may be determined based on a required boost ratio for the voltage conversion circuit.

In addition, there may be K first switch modules included in the voltage conversion circuit, where K is an integer greater than or equal to 1 and less than N. When K is equal to 1, a structure of the voltage conversion circuit is shown in FIG. 6. When K is greater than 1, the K first switch modules are connected in series, and the K first switch modules connected in series are connected in parallel to the N second switch modules connected in series (in this case, a connection relationship is equivalent to the voltage conversion circuit shown in FIG. 6).

Figure 7:
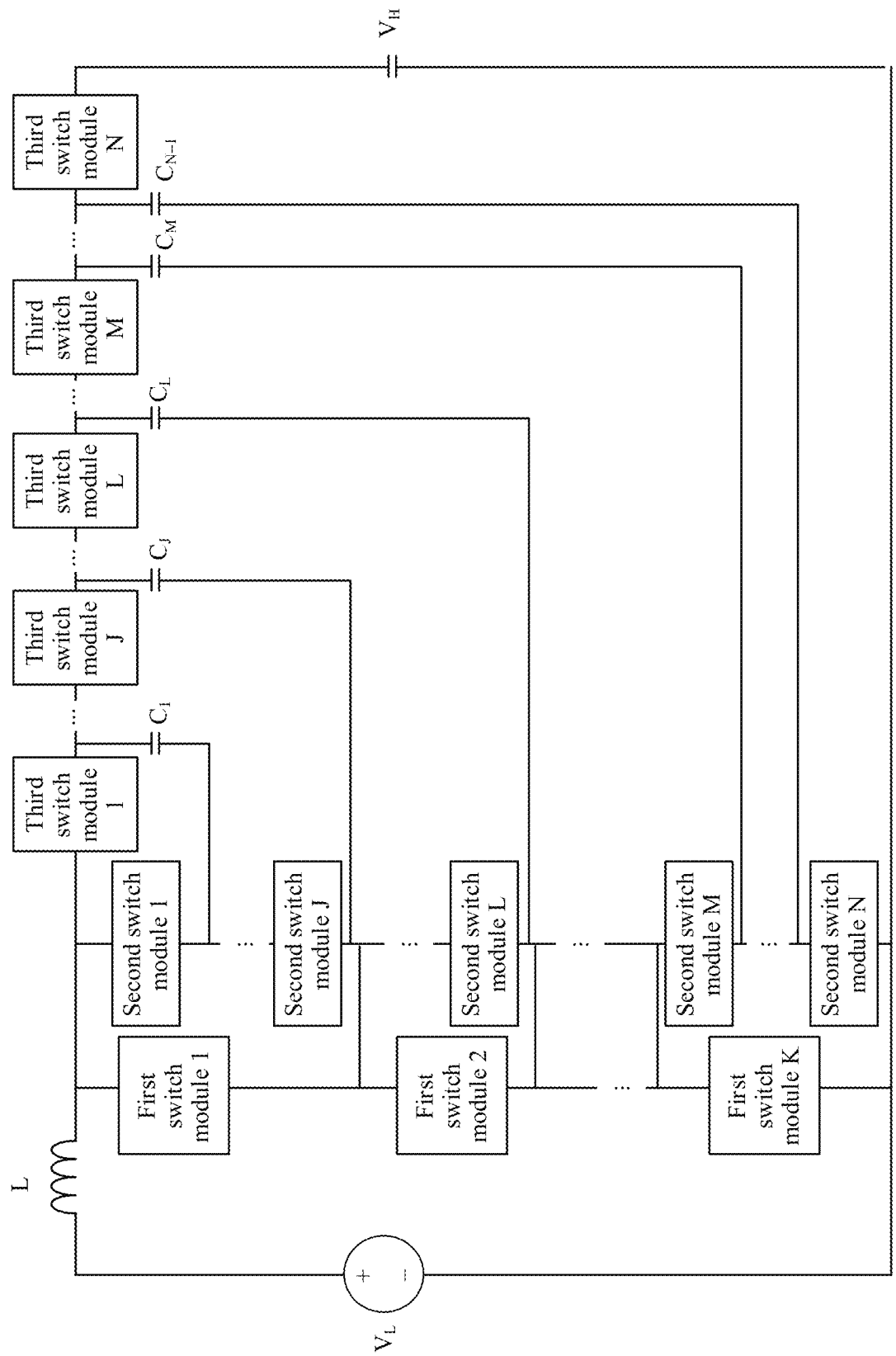
FIG. 7 is a schematic diagram of a structure of another voltage conversion circuit according to an embodiment of this application.

Alternatively, FIG. 7 is a schematic diagram of a structure of another voltage conversion circuit according to an embodiment of this application. As shown in FIG. 7, each first switch module may be connected in parallel to a plurality of second switch modules, and quantities of second switch modules connected in parallel to the first switch modules may be the same or may be different. For example, a first switch module 1 is connected in parallel to a first to a $J^{th}$ second switch modules, and a first switch module 2 is connected in parallel to a $(J+1)^{th}$ second switch module to a $Q^{th}$ second switch module. By analogy, a first switch module K is connected in parallel to a $Z^{th}$ second switch module to an $N^{th}$ second switch module.

For ease of description, one first switch module is used as an example for description in the drawings related to subsequent embodiments.

Optionally, each switch module in this embodiment of this application may be any switch module that can be turned on or off based on control, for example, an insulated gate bipolar transistor (IGBT), a metal-oxide-semiconductor field-effect transistor (MOSFET), a transistor, a thyristor, a diode, a switch module that includes a MOSFET and a diode that are anti-parallel connected, or a switch module that includes an IGBT and a diode that are anti-parallel connected. Different switch modules may be different or the same. For example, the first switch module is implemented by using a MOS transistor, the second switch module is implemented by using an IGBT, and the third switch module is implemented by using a transistor; or the first switch module, the second switch module, and the third switch module are all implemented by using IGBTs.

In addition, the N second switch modules in the circuit may be the same or different. The N third switch modules in the circuit may be the same or different. The second switch module is used as an example. Some second switch modules are implemented by using IGBTs, and some second switch modules are implemented by using MOSs; or the second switch modules are all implemented by using MOSs.

The following describes a boost manner of the voltage conversion circuit provided in this embodiment of this application.

The voltage conversion circuit may include three operation modes: an inductor charging mode, a flying capacitor charging mode, and a boost discharging mode. In the inductor charging mode, the low-voltage power supply $V_L$ and the inductor L may form a closed loop by using the first switch module, the second switch modules, and the third switch modules, to charge the inductor L in the voltage conversion circuit. In the flying capacitor charging mode, the low-voltage power supply $V_L$, the inductor L, and at least one flying capacitor in the N−1 flying capacitors may form a closed loop by using the first switch module, the second switch modules, and the third switch modules, to charge the at least one flying capacitor in the N−1 flying capacitors. In the boost discharging mode, the low-voltage power supply $V_L$, the inductor L, one or more flying capacitors in the at least one flying capacitor, and the high-voltage power supply $V_H$ may form a closed loop by using the first switch module, the second switch modules, and the third switch modules, so that the low-voltage power supply $V_L$, the inductor L, and the one or more flying capacitors charged in the flying capacitor charging mode jointly discharge to the high-voltage power supply $V_H$, that is, supply power to the high-voltage power supply.

In other words, the voltage conversion circuit provided in this embodiment of this application first stores energy by using the inductor and the flying capacitors, so that the low-voltage power supply, the inductor, and the flying capacitors jointly discharge to the high-voltage power supply located on an output side, to implement a higher boost ratio. In some embodiments, the voltage conversion circuit may also be referred to as a non-isolated multi-level voltage conversion circuit or a non-isolated multi-level direct current circuit.

In addition, in the voltage conversion circuit, the N−1 flying capacitors may be considered as N−1 flying capacitors connected stage by stage. Subsequently, a required stage quantity for the flying capacitors and second switch modules and third switch modules that correspond to the flying capacitors may be adaptively adjusted based on a required boost ratio. To be specific, a higher boost ratio may be implemented by cascading more flying capacitors.

With reference to an exemplary structure, the following describes how to control the voltage conversion circuit provided in this embodiment of this application when there are different quantities of flying capacitors.

Structure 1: The voltage conversion circuit includes one flying capacitor.

Figure 8:
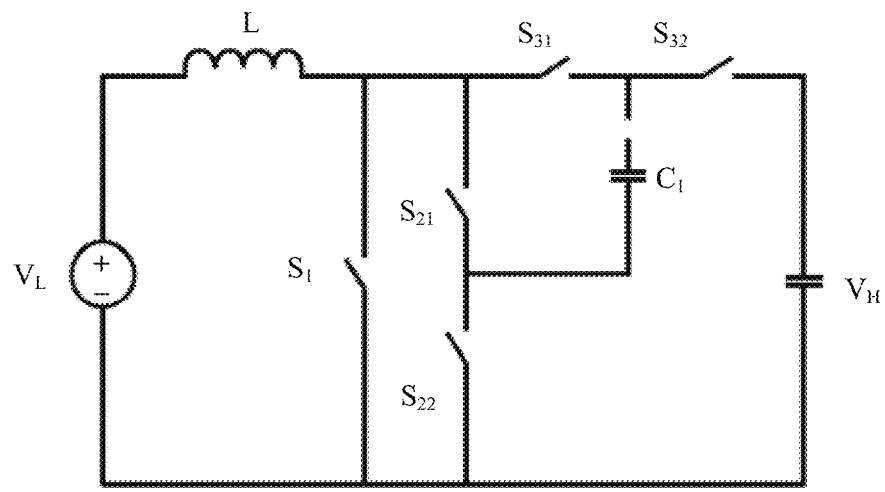
FIG. 8 is a schematic diagram of a structure of still another voltage conversion circuit according to an embodiment of this application.

FIG. 8 is a schematic diagram of a structure of still another voltage conversion circuit according to an embodiment of this application. As shown in FIG. 8, N in the voltage conversion circuit is equal to 2. To be specific, the voltage conversion circuit includes one first switch module $S_1$, two second switch modules $S_{21}$ and $S_{22}$, two third switch modules $S_{31}$ and $S_{32}$, and one flying capacitor $C_1$.

In the example, the first switch module $S_1$, the second switch module 52$i$, and the second switch module $S_{22}$ each may be implemented by using, for example, a switch module including a MOSFET transistor and a diode that are anti-parallel connected, and the third switch module $S_{31}$ and the third switch module $S_{32}$ each may be implemented by using a diode. For brevity of description, in FIG. 8, an ideal switch model is used to replace each switch module in the voltage conversion circuit, but this does not change logic of each switch module.

Figure 9:
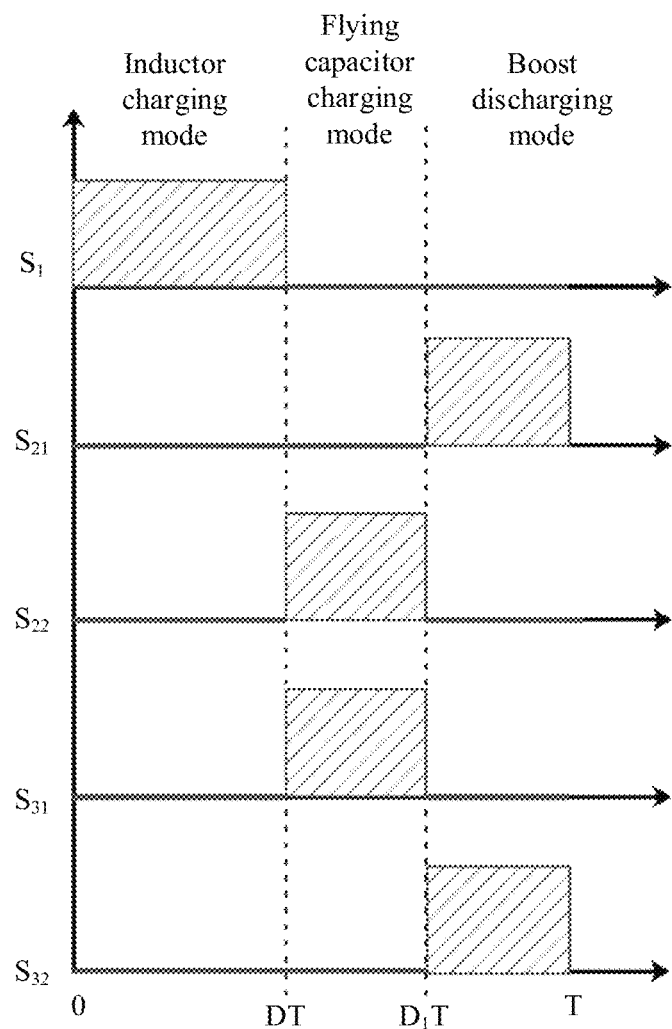
FIG. 9 is a schematic diagram of a switching sequence according to an embodiment of this application.

FIG. 9 is a schematic diagram of a switching sequence according to an embodiment of this application. As shown in FIG. 9, a control manner of the voltage conversion circuit shown in FIG. 8 in a continuous conduction mode is described by using an example in which the voltage conversion circuit includes an inductor charging mode, a flying capacitor charging mode, and a boost discharging mode in one switching period T.

Figure 10:
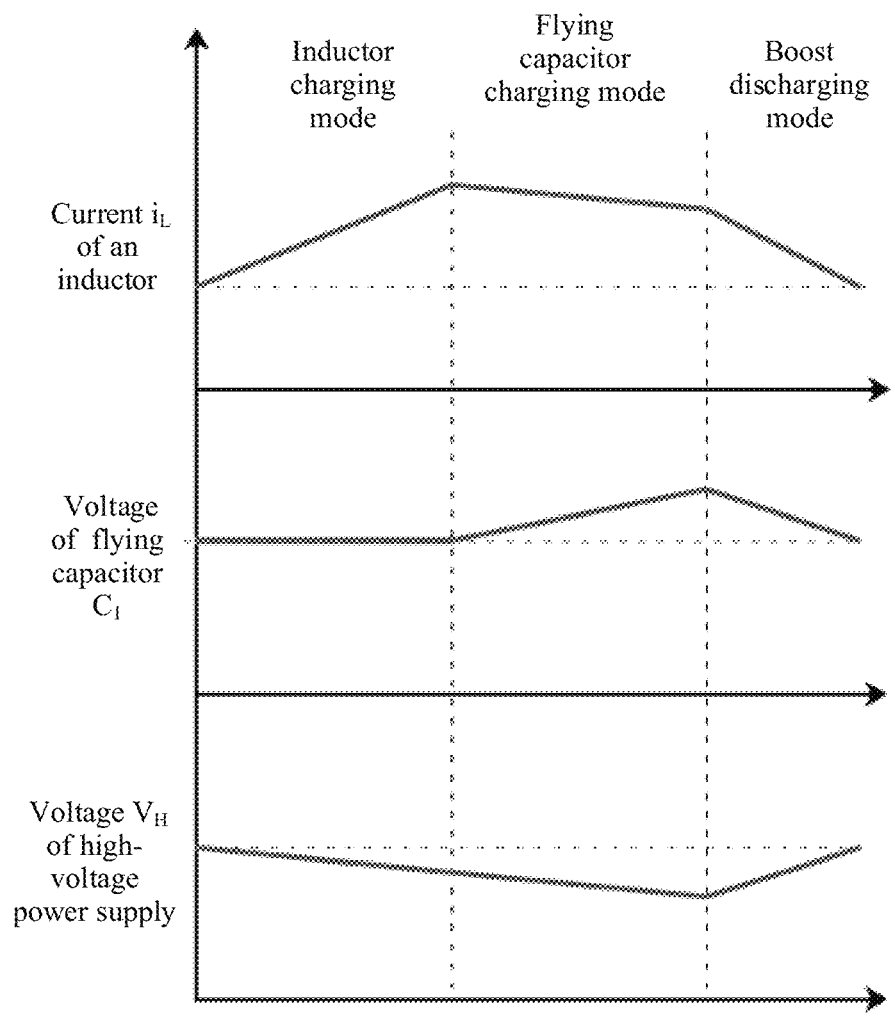
FIG. 10 is a schematic diagram of a parameter waveform according to an embodiment of this application.
Figure 11:
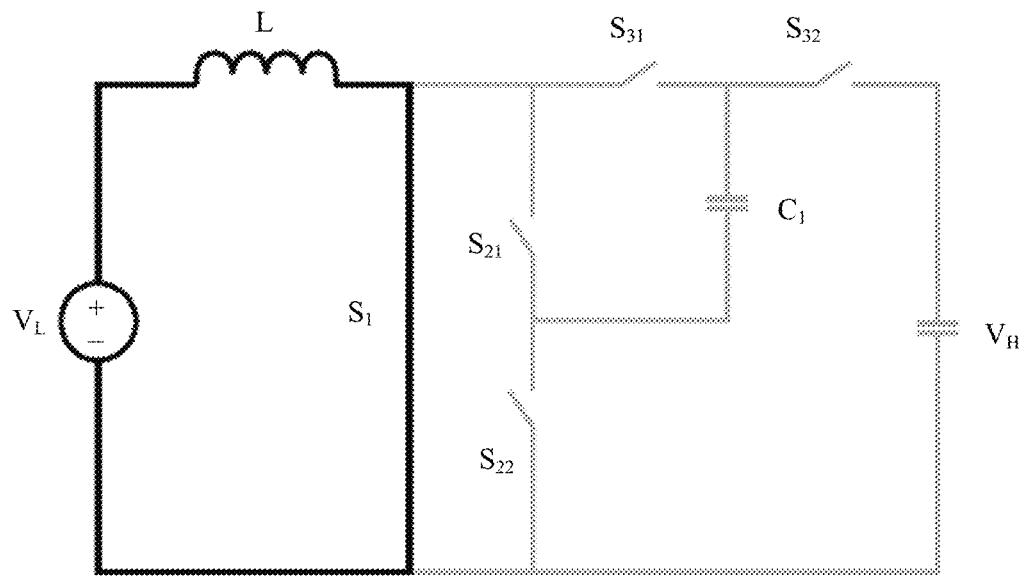
FIG. 11 is a schematic diagram of an inductor charging mode of still another voltage conversion circuit according to an embodiment of this application.

Inductor charging mode: FIG. 10 is a schematic diagram of a parameter waveform according to an embodiment of this application, and FIG. 11 is a schematic diagram of an inductor charging mode of still another voltage conversion circuit according to an embodiment of this application. Refer to FIG. 9 to FIG. 11. In a time period from 0 to DT, the first switch module $S_1$ is controlled to be closed, and the second switch modules $S_{21}$ and $S_{22}$ and the third switch modules $S_{31}$ and $S_{32}$ are all disconnected, so that the low-voltage power supply and the inductor are connected in series to form a closed loop, and the voltage conversion circuit enters the inductor charging mode to charge the inductor. During charging of the inductor, a current magnitude $i_L$ of the inductor increases.

In this case, because the flying capacitor $C_1$ does not form the closed loop, a voltage magnitude of the flying capacitor $C_1$ remains unchanged. In addition, because the voltage conversion circuit is in the continuous conduction mode, the high-voltage power supply still continuously discharges to an external load in the operation mode. Therefore, a voltage magnitude of the high-voltage power supply slightly decreases.

Figure 12:
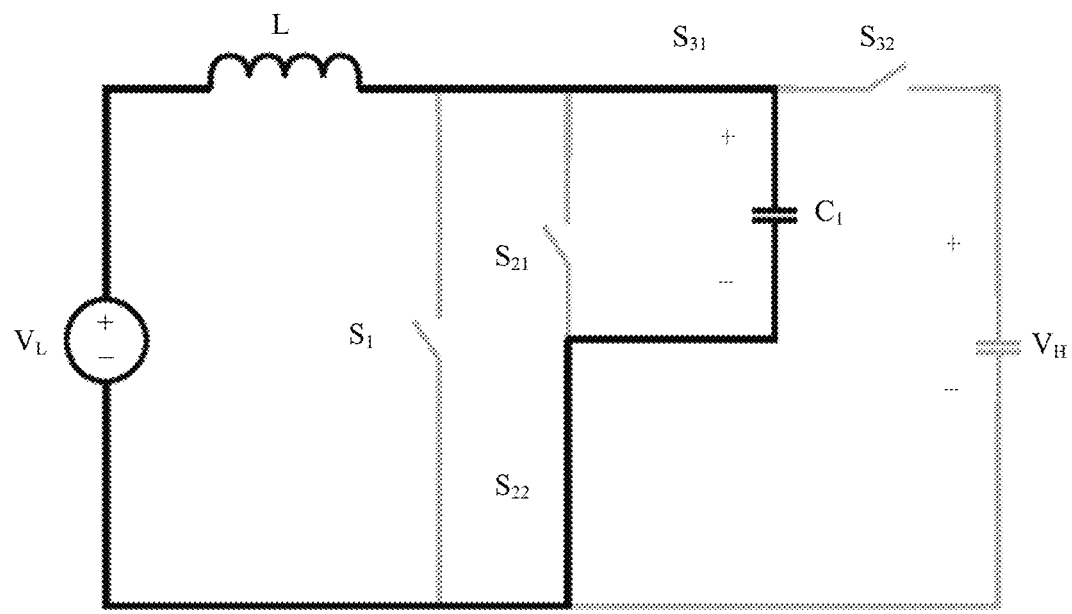
FIG. 12 is a schematic diagram of a flying capacitor charging mode of still another voltage conversion circuit according to an embodiment of this application.

Flying capacitor charging mode: FIG. 12 is a schematic diagram of a flying capacitor charging mode of still another voltage conversion circuit according to an embodiment of this application. Refer to FIG. 9, FIG. 10, and FIG. 12. In a time period from DT to $D_1T$, the first switch module $S_1$, the second switch module $S_{21}$, and the third switch module $S_{32}$ are all controlled to be disconnected, and the second switch module $S_{22}$ and the third switch module $S_{31}$ are closed, so that the low-voltage power supply, the inductor, and the flying capacitor $C_1$ are connected in series to form a closed loop, and the voltage conversion circuit enters the flying capacitor charging mode to charge the flying capacitor $C_1$.

During charging of the flying capacitor $C_1$, a voltage magnitude of the flying capacitor $C_1$ increases.

In the operation mode, if a voltage magnitude of the low-voltage power supply is greater than the voltage magnitude of the flying capacitor $C_1$, the low-voltage power supply also charges the inductor while charging the flying capacitor $C_1$. Therefore, the current magnitude $i_L$ of the inductor increases. If the voltage magnitude of the low-voltage power supply is less than the voltage magnitude of the flying capacitor $C_1$, the low-voltage power supply and the inductor are connected in series to jointly charge the flying capacitor $C_1$. Therefore, the current magnitude $i_L$ of the inductor decreases. FIG. 10 is a schematic diagram of an example in which the current magnitude $i_L$ of the inductor decreases.

Because the voltage conversion circuit is in the continuous conduction mode, the high-voltage power supply still continuously discharges to an external load in the operation mode. Therefore, a voltage magnitude of the high-voltage power supply slightly decreases.

Figure 13:
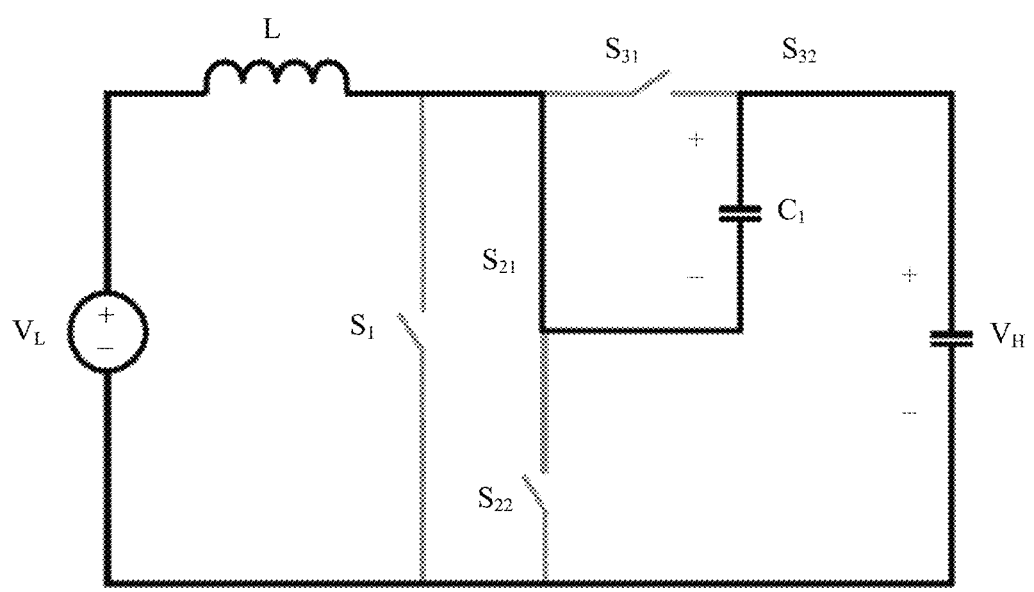
FIG. 13 is a schematic diagram of a boost discharging mode of still another voltage conversion circuit according to an embodiment of this application.

Boost discharging mode: FIG. 13 is a schematic diagram of a boost discharging mode of still another voltage conversion circuit according to an embodiment of this application. Refer to FIG. 9, FIG. 10, and FIG. 13. In a time period from $D_1T$ to T, the first switch module $S_1$, the second switch module $S_{22}$, and the third switch module $S_{31}$ are all controlled to be disconnected, and the second switch module $S_{21}$ and the third switch module $S_{32}$ are closed, so that the low-voltage power supply, the inductor, the flying capacitor $C_1$, and the high-voltage power supply are connected in series to form a closed loop. In this case, the flying capacitor $C_1$ is reversely connected in series, to be specific, polarity in the serial loop formed in the boost discharging mode by the flying capacitor $C_1$ is opposite to polarity in the serial loop formed in the flying capacitor charging mode by the flying capacitor $C_1$ (for details, refer to polarities of the flying capacitor $C_1$ shown in FIG. 12 and FIG. 13). Therefore, the low-voltage power supply, the inductor, and the flying capacitor $C_1$ jointly discharge to the high-voltage power supply after being connected in series. Therefore, the voltage magnitude of the flying capacitor $C_1$ decreases, the current magnitude of the inductor decreases, and the voltage magnitude of the high-voltage power supply increases.

Figure 14:
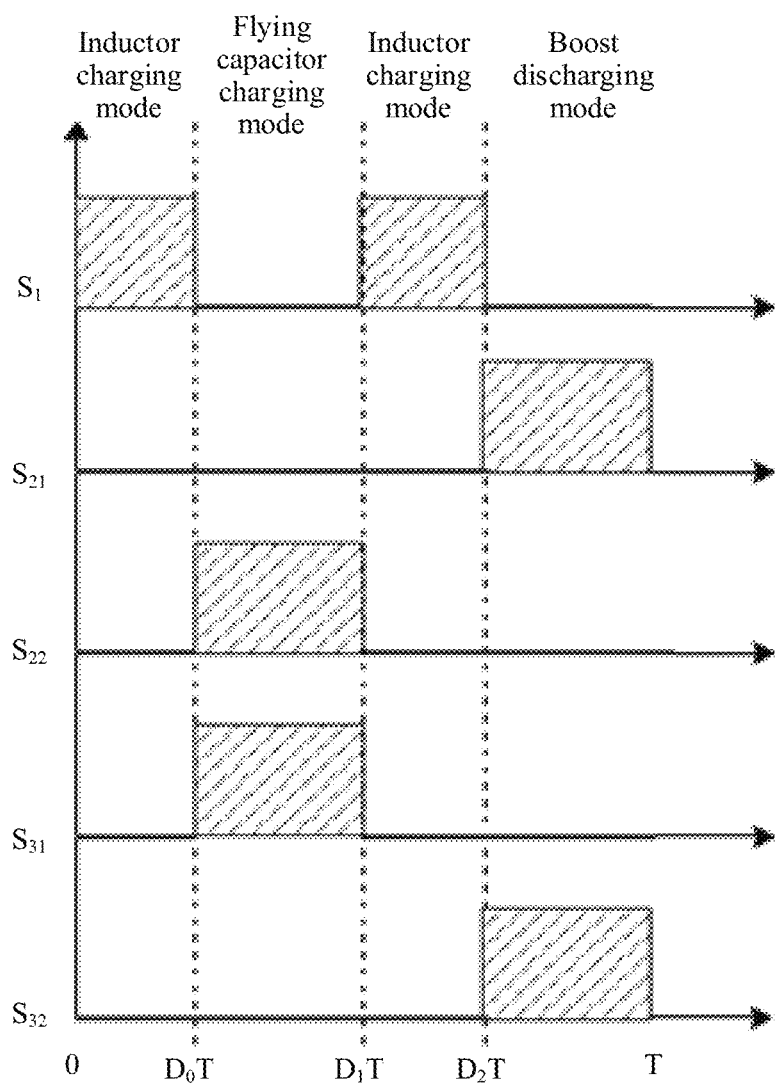
FIG. 14 is a schematic diagram 2 of a parameter waveform of still another voltage conversion circuit according to an embodiment of this application.

In the examples, although each operation mode is described by using the example in which the voltage conversion circuit includes an inductor charging mode, a flying capacitor charging mode, and a boost discharging mode in one switching period, it should be understood that the voltage conversion circuit includes at least an inductor charging mode, a flying capacitor charging mode, and a boost discharging mode in one switching period. In other words, a quantity of each operation mode may be alternatively plural. To be specific, one operation mode occurs in a plurality of time periods, so that the operation mode is allocated more evenly, and current ripples of the inductor or voltage ripples of a capacitor in the operation mode can be reduced. FIG. 14 is a schematic diagram 2 of a parameter waveform of still another voltage conversion circuit according to an embodiment of this application. As shown in FIG. 14, for example, in one switching period, the inductor charging mode occurs twice, namely, a time period from 0 to $D_0T$ and a time period from $D_1T$ to $D_2T$, so that the current ripples of the inductor can be reduced.

It should be understood that although the current ripples of the inductor or the voltage ripples of the capacitor can be reduced according to the manner in which one switching period includes a plurality of same operation modes, switching times of the switch modules are correspondingly increased. Consequently, a loss of the switch modules is increased. Therefore, in exemplary implementation, the quantity of each operation mode included in one switching period may be determined based on an actual requirement.

It can be learned from the foregoing description that the switching period in this embodiment of this application is a period in which an operation mode combination of the voltage conversion circuit repeatedly occurs. The operation mode combination shown in FIG. 9 is used as an example, to be specific, an inductor charging mode, a flying capacitor charging mode, and a boost discharging mode form one switching period. An operation mode combination shown in FIG. 14 is used as an example. An inductor charging mode, a flying capacitor charging mode, an inductor charging mode, and a boost discharging mode form one switching period. It should be noted that if a plurality of same operation modes are included in one switching period, the operation modes may be combined by following a principle of first charging and then discharging. Details are not described again.

According to a volt-second balance principle, the boost ratio $$\frac{V_H}{V_L}$$

of the voltage conversion circuit shown in FIG. 8 in the continuous conduction mode is shown in the following formula (3):

$$\frac{V_H}{V_L} = \frac{2}{1-D} \tag{3}$$

D in the formula (3) refers to a duty cycle of the first switch module.

It can be seen from the formula (3) that the boost ratio of the voltage conversion circuit is twice that of the boost conversion circuit shown in FIG. 4. Therefore, when the voltage conversion circuit provided in this embodiment of this application and the boost conversion circuit shown in FIG. 4 are used in a same photovoltaic power generation system, compared with the boost conversion circuit shown in FIG. 4, in this embodiment of this application, a quantity of photovoltaic components connected in series in a photovoltaic string may be reduced by half, thereby reducing a risk caused by inconsistency and improving reliability of the photovoltaic string.

Structure 2: The voltage conversion circuit includes a plurality of flying capacitors.

The plurality of flying capacitors included in the voltage conversion circuit may be flying capacitors with a same capacitance value or flying capacitors with capacitance values that are gradually increased stage by stage. To be specific, a capacitance value of the flying capacitor $C_1$ is less than a capacitance value of a flying capacitor $C_2$, the capacitance value of the flying capacitor $C_2$ is less than a capacitance value of a flying capacitor $C_3$, and so on.

Control manner 1: When the plurality of flying capacitors included in the voltage conversion circuit are flying capacitors with a same capacitance value or flying capacitors with capacitance values that are gradually increased stage by stage, the voltage conversion circuit may be controlled to operate in the continuous conduction mode in the following manner.

Specifically, several flying capacitors that participate in charging and discharging in the voltage conversion circuit are determined based on a magnitude of a current output by the low-voltage power supply. A larger current indicates a larger quantity of flying capacitors that participate in charging and discharging. When there are a plurality of flying capacitors that participate in charging and discharging, the flying capacitors that participate in charging and discharging are connected in parallel, and are equivalent to one flying capacitor for use. For example, the magnitude of the current output by the low-voltage power supply may be obtained, for example, by collecting a current value of the inductor. The current value of the inductor described herein may be, for example, an average current value of the inductor.

In this embodiment of this application, a mapping relationship between the magnitude of the current output by the low-voltage power supply and the quantity of the flying capacitors that participate in charging and discharging is not limited, and may be determined based on a capacitance value of a flying capacitor actually used in the voltage conversion circuit. For example, that the average current value of the inductor is used as the magnitude of the current output by the low-voltage power supply is used as an example. It is assumed that a nominal current value of the inductor is $I_{nom}$, the mapping relationship may be shown, for example, in the following Table 1:

TABLE 1

| Current value | Quantity of flying capacitors connected in parallel |
|---|---|
| Average current value of the inductor ≤ $I_{nom}/N$ | 1 |
| $I_{nom}/N$ < Average current value of the inductor ≤ 2 * $I_{nom}/N$ | 2 |
| 2 * $I_{nom}/N$ < Average current value of the inductor ≤ 3 * $I_{nom}/N$ | 3 |
| ... | ... |
| (N − 1) * $I_{nom}/N$ < Average current value of the inductor ≤ N * $I_{nom}/N$ | N |

It should be understood that Table 1 is merely an example in which the magnitude of the current output by the low-voltage power supply and the quantity of the flying capacitors that participate in charging and discharging are set with reference to the nominal current value $I_{nom}$ of the inductor. In exemplary implementation, the magnitude of the current output by the low-voltage power supply and the quantity of the flying capacitors that participate in charging and discharging may be alternatively set with reference to another threshold.

According to the manner, when the current output by the low-voltage power supply is small, fewer flying capacitors can be used in the voltage conversion circuit to participate in charging and discharging. In this way, a capacitance value after the flying capacitors that participate in charging and discharging are equivalent to one flying capacitor is small, so that a change in a voltage magnitude of the flying capacitor is great. Therefore, a speed of boost conversion of the voltage conversion circuit is higher (namely, a faster response). When the current output by the low-voltage power supply is large, more flying capacitors are used in the voltage conversion circuit to participate in charging and discharging. In this way, a capacitance value after the flying capacitors that participate in charging and are equivalent to one flying capacitor is large, so that a change in a voltage magnitude of the flying capacitor is minor (or a voltage fluctuation is slight). Therefore, stability of a device or system in which the voltage conversion circuit is used is higher.

When the voltage conversion circuit is used in the photovoltaic power generation system, the voltage conversion circuit may adaptively select, based on a magnitude of a current corresponding to electric energy converted by the photovoltaic power generation system from widespread light energy in an ambient environment, one or more flying capacitors to participate in charging and discharging.

The following uses an exemplary example to describe how to control the voltage conversion circuit to use different quantities of flying capacitors.

Figure 15:
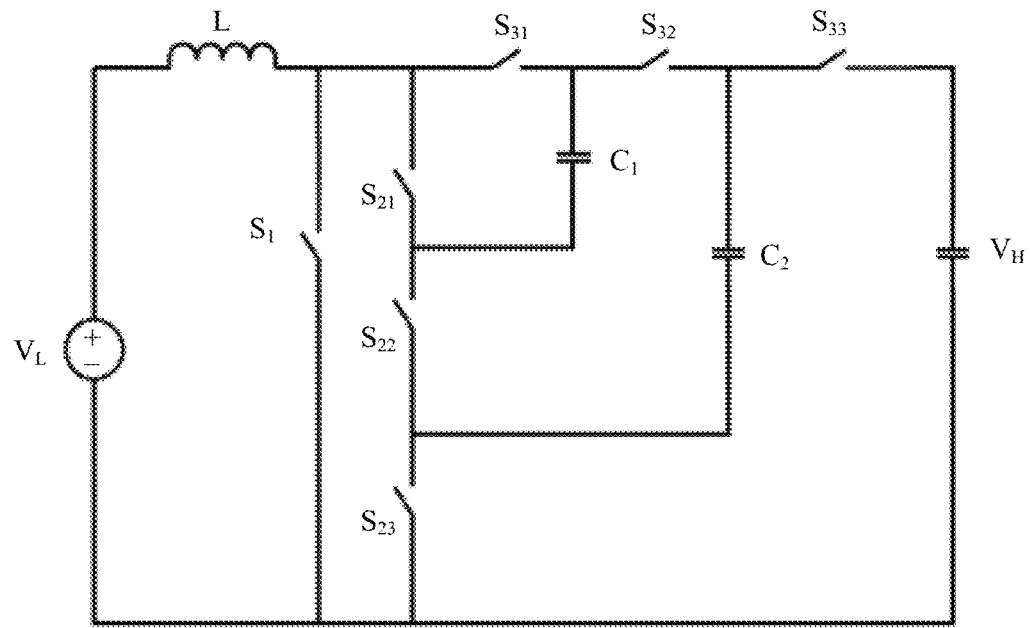
FIG. 15 is a schematic diagram of a structure of yet another voltage conversion circuit according to an embodiment of this application.

FIG. 15 is a schematic diagram of a structure of yet another voltage conversion circuit according to an embodiment of this application. As shown in FIG. 15, that the voltage conversion circuit includes two flying capacitors is used as an example, and N in the voltage conversion circuit is equal to 3. To be specific, the voltage conversion circuit includes one first switch module $S_1$, three second switch modules $S_{21}$, $S_{22}$, and $S_{23}$, three third switch modules $S_{31}$, $S_{32}$, and $S_{33}$, and two flying capacitors $C_1$ and $C_2$. For brevity of description, in FIG. 15, an ideal switch model is used to replace each switch module in the voltage conversion circuit. However, this does not change logic of each switch module. In exemplary implementation, a required switch module may be selected based on an actual requirement.

The following uses the switching sequence shown in FIG. 9 as an example, to describe a control manner of the voltage conversion circuit shown in FIG. 15 in the continuous conduction mode.

Figure 16:
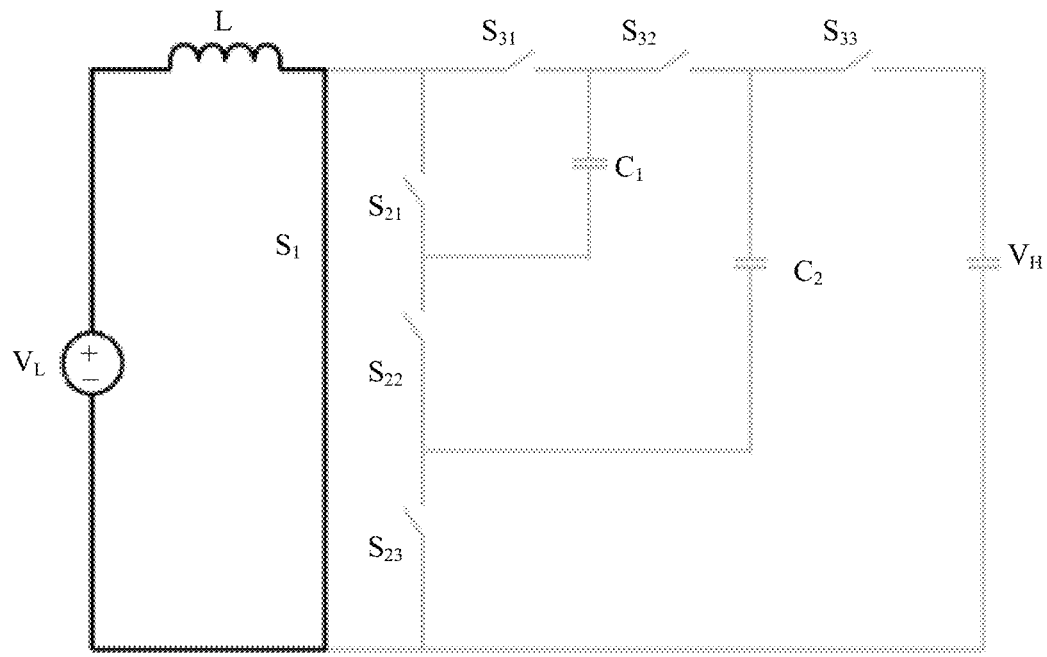
FIG. 16 is a schematic diagram of an inductor charging mode of yet another voltage conversion circuit according to an embodiment of this application.

When it is determined, based on the magnitude of the current output by the low-voltage power supply, that the voltage conversion circuit uses one flying capacitor to participate in charging and discharging, that the flying capacitor $C_1$ is used to participate in charging and discharging is used as an example, and a control process of the voltage conversion circuit is shown as follows:

Inductor charging mode: FIG. 16 is a schematic diagram of an inductor charging mode of yet another voltage conversion circuit according to an embodiment of this application. Refer to FIG. 9, FIG. 10, and FIG. 16. In a time period from 0 to DT, the first switch module $S_1$ is controlled to be closed, and the second switch modules $S_{21}$, $S_{22}$, and $S_{23}$ and the third switch modules $S_{31}$, $S_{32}$, and $S_{33}$ are all disconnected, so that the low-voltage power supply and the inductor are connected in series to form a closed loop, and the voltage conversion circuit enters the inductor charging mode to charge the inductor.

Figure 17:
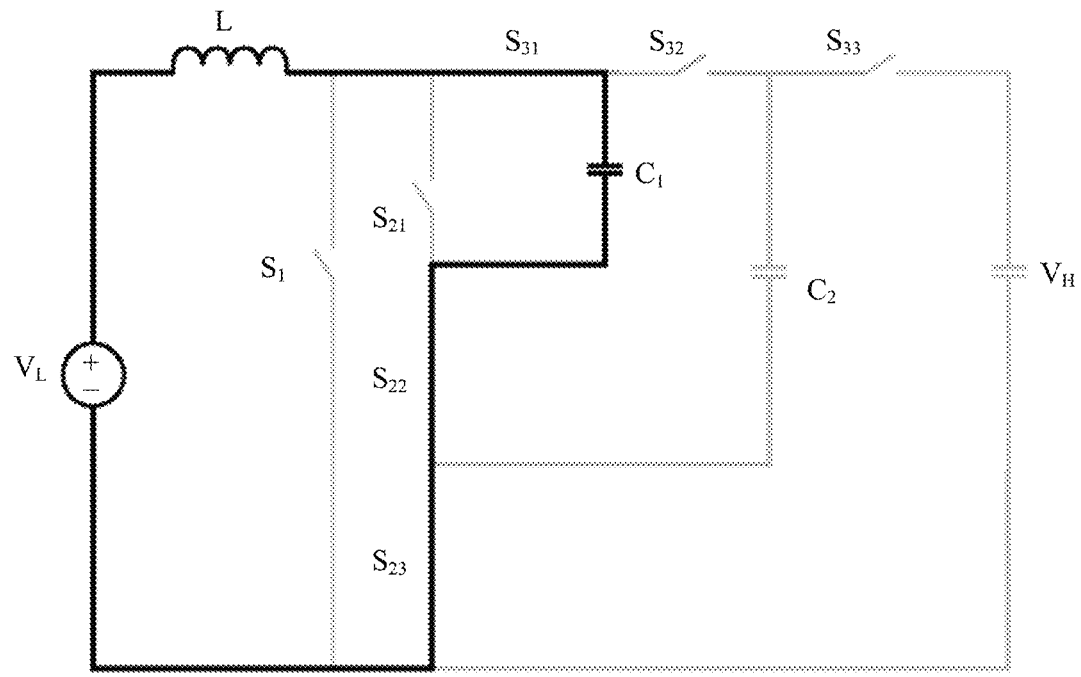
FIG. 17 is a schematic diagram 1 of a flying capacitor charging mode of yet another voltage conversion circuit according to an embodiment of this application.

Flying capacitor charging mode: FIG. 17 is a schematic diagram 1 of a flying capacitor charging mode of yet another voltage conversion circuit according to an embodiment of this application. Refer to FIG. 9, FIG. 10, and FIG. 17. In a time period from DT to $D_1T$, the first switch module $S_1$, the second switch module $S_{21}$, and the third switch modules $S_{32}$ and $S_{33}$ are all controlled to be disconnected, and the second switch modules $S_{22}$ and $S_{23}$ and the third switch module $S_{31}$ are closed, so that the low-voltage power supply, the inductor, and the flying capacitor $C_1$ are connected in series to form a closed loop, and the voltage conversion circuit enters the flying capacitor charging mode to charge the flying capacitor $C_1$.

Figure 18:
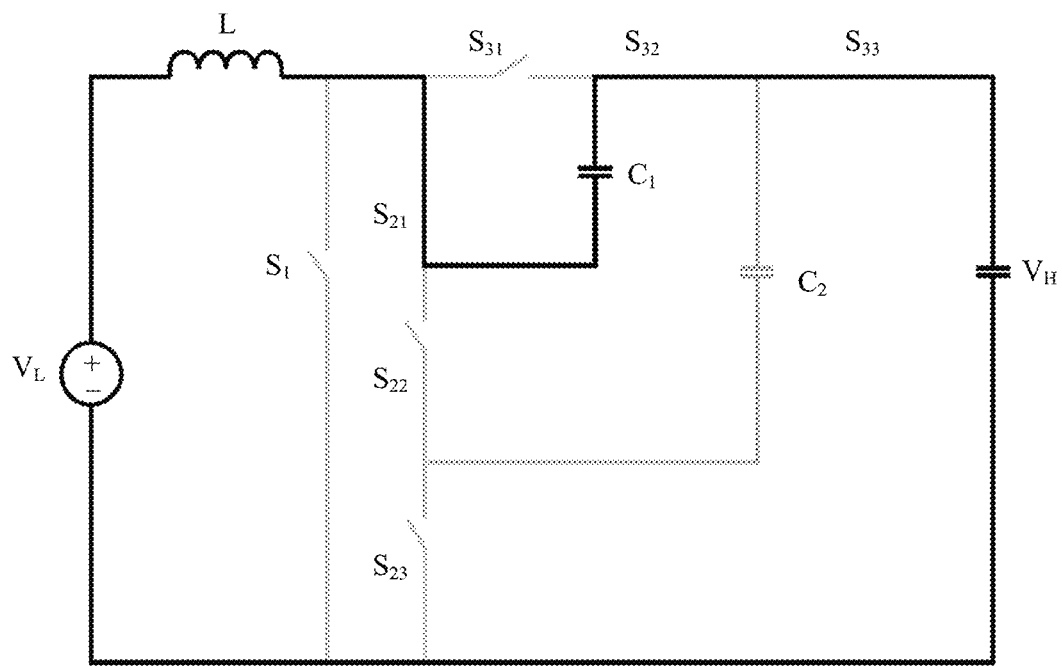
FIG. 18 is a schematic diagram 1 of a boost discharging mode of yet another voltage conversion circuit according to an embodiment of this application.

Boost discharging mode: FIG. 18 is a schematic diagram 1 of a boost discharging mode of yet another voltage conversion circuit according to an embodiment of this application. Refer to FIG. 9, FIG. 10, and FIG. 18. In a time period from $D_1T$ to T, the first switch module $S_1$, the second switch modules $S_{22}$ and $S_{23}$, and the third switch module $S_{31}$ are all controlled to be disconnected, and the second switch module $S_{21}$ and the third switch modules $S_{32}$ and $S_{33}$ are closed, so that the low-voltage power supply, the inductor, the flying capacitor $C_1$, and the high-voltage power supply are connected in series to form a closed loop, and the low-voltage power supply, the inductor, and the flying capacitor $C_1$ jointly discharge to the high-voltage power supply after being connected in series.

In the control manner, the boost ratio of the voltage conversion circuit shown in FIG. 15 in the continuous conduction mode (that is, when power supply is not interrupted) is shown in the foregoing formula (3). To be specific, the boost ratio of the voltage conversion circuit is twice that of the boost conversion circuit shown in FIG. 4. Therefore, when the voltage conversion circuit provided in this embodiment of this application and the boost conversion circuit shown in FIG. 4 are used in a same photovoltaic power generation system, compared with the boost conversion circuit shown in FIG. 4, in this embodiment of this application, a quantity of photovoltaic components connected in series in a photovoltaic string may be reduced by half, thereby reducing a risk caused by inconsistency and improving reliability of the photovoltaic string.

When it is determined, based on the magnitude of the current output by the low-voltage power supply, that the voltage conversion circuit uses two flying capacitors to participate in charging and discharging, that the flying capacitors $C_1$ and $C_2$ are used to participate in charging and discharging is used as an example, and a control process of the voltage conversion circuit is shown as follows:

Inductor charging mode: Content of this part is the same as the inductor charging mode shown in FIG. 16. Details are not described again.

Figure 19:
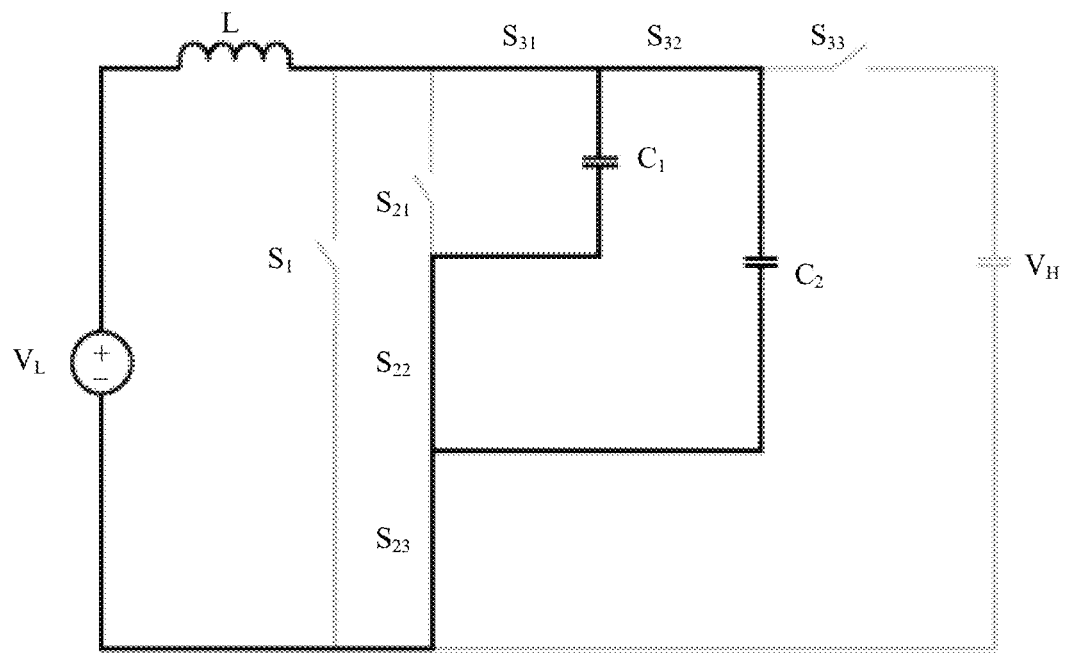
FIG. 19 is a schematic diagram 2 of a flying capacitor charging mode of yet another voltage conversion circuit according to an embodiment of this application.

Flying capacitor charging mode: FIG. 19 is a schematic diagram 2 of a flying capacitor charging mode of yet another voltage conversion circuit according to an embodiment of this application. Refer to FIG. 9, FIG. 10, and FIG. 19. In a time period from DT to $D_1T$, the first switch module $S_1$, the second switch module $S_{21}$, and the third switch module $S_{33}$ are all controlled to be disconnected, and the second switch modules $S_{22}$ and $S_{23}$ and the third switch modules $S_{31}$ and $S_{32}$ are closed, so that the low-voltage power supply, the inductor, and "the flying capacitor $C_1$ and the flying capacitor $C_2$ connected in parallel" are connected in series to form a closed loop, and the voltage conversion circuit enters the flying capacitor charging mode to charge the flying capacitor $C_1$ and the flying capacitor $C_2$.

Figure 20:
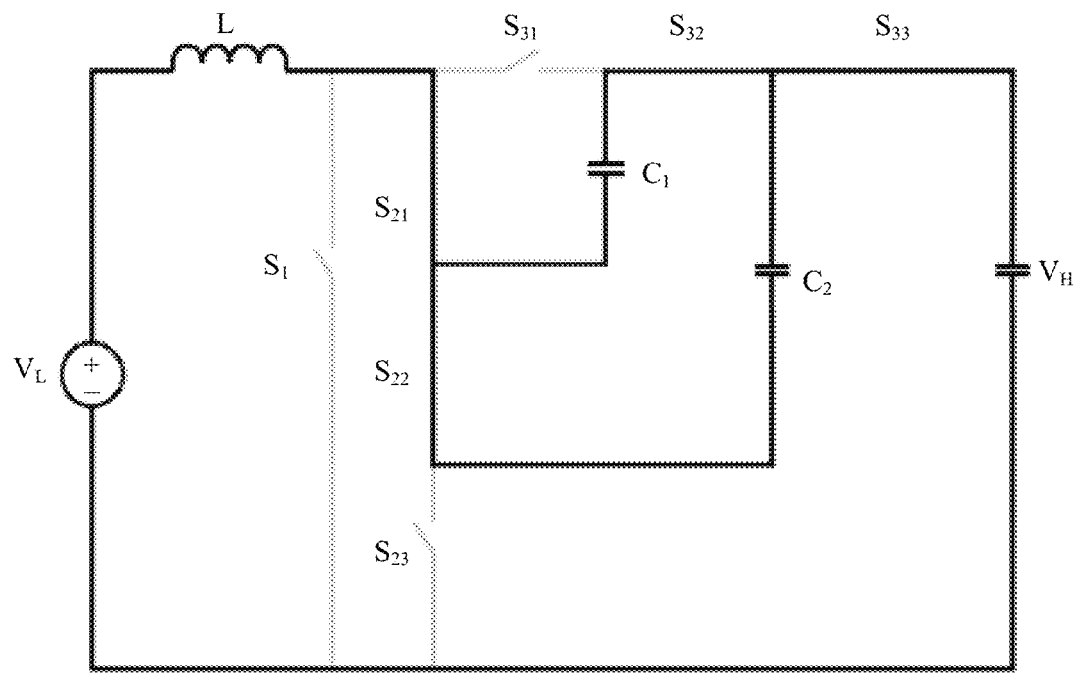
FIG. 20 is a schematic diagram 2 of a boost discharging mode of yet another voltage conversion circuit according to an embodiment of this application.

Boost discharging mode: FIG. 20 is a schematic diagram 2 of a boost discharging mode of yet another voltage conversion circuit according to an embodiment of this application. Refer to FIG. 9, FIG. 10, and FIG. 20. In a time period from $D_1T$ to T, the first switch module $S_1$, the second switch module $S_{23}$, and the third switch module $S_{31}$ are all controlled to be disconnected, and the second switch modules $S_{21}$ and $S_{22}$ and the third switch modules $S_{32}$ and $S_{33}$ are closed, so that the low-voltage power supply, the inductor, "the flying capacitor $C_1$ and the flying capacitor $C_2$ connected in parallel", and the high-voltage power supply are connected in series to form a closed loop, and the low-voltage power supply, the inductor, the flying capacitor $C_1$, and the flying capacitor $C_2$ jointly discharge to the high-voltage power supply.

It can be learned from the descriptions of the foregoing examples that, for the control manner 1, manners for the voltage conversion circuit to enter the flying capacitor charging mode and the boost discharging mode are summarized as follows:

Flying capacitor charging mode: The first switch module is disconnected, a first third switch module to an $X^{th}$ third switch module are all closed, a $Y^{th}$ second switch module to an $N^{th}$ second switch module are all closed, and the remaining second switch modules and third switch modules are all disconnected. X is an integer greater than or equal to 1 and less than N, and Y is an integer greater than or equal to 1 and less than or equal to X+1.

A value of Y is related to a quantity of flying capacitors for charging and a quantity of flying capacitors for discharging in a subsequent boost discharging mode. Y=X+1 is used as an example. In this case, the low-voltage power supply, the inductor, and an $X^{th}$ flying capacitor are connected in series to form a closed loop, to charge the $X^{th}$ flying capacitor. When X is greater than 1, Y=X is used as an example. In this case, the low-voltage power supply, the inductor, and "an (X−1)th flying capacitor and the $X^{th}$ flying capacitor connected in parallel" are connected in series to form a closed loop. In the example, the voltage conversion circuit simultaneously charges the $(X-1)^{th}$ flying capacitor and the $X^{th}$ flying capacitor.

Boost discharging mode: The first switch module is disconnected, a first second switch module to an $X^{th}$ second switch module are all closed, a $Y^{th}$ third switch module to an $N^{th}$ third switch module are all closed, and the remaining second switch modules and third switch modules are all disconnected.

Y=X+1 is used as an example. In this case, the low-voltage power supply, the inductor, the $X^{th}$ flying capacitor, and the high-voltage power supply are connected in series to form a closed loop, to jointly discharge to the high-voltage power supply. When X is greater than 1, Y=X is used as an example. In this case, the low-voltage power supply, the inductor, "the $(X-1)^{th}$ flying capacitor and the $X^{th}$ flying capacitor connected in parallel", and the high-voltage power supply are connected in series to form a closed loop, to jointly discharge to the high-voltage power supply.

In the control manner, according to the volt-second balance principle, the boost ratio $$\frac{V_H}{V_L}$$

of the voltage conversion circuit shown in FIG. 15 in the continuous conduction mode (that is, when power supply is not interrupted) is shown in the foregoing formula (3).

It can be seen from the formula (3) that the boost ratio of the voltage conversion circuit is at least twice that of the boost conversion circuit shown in FIG. 4. Therefore, when the voltage conversion circuit provided in this embodiment of this application and the boost conversion circuit shown in FIG. 4 are used in a same photovoltaic power generation system, compared with the boost conversion circuit shown in FIG. 4, in this embodiment of this application, a quantity of photovoltaic components connected in series in a photovoltaic string may be reduced by at least half, thereby reducing a risk caused by inconsistency and improving reliability of the photovoltaic string.

It should be understood that in the foregoing examples shown in FIG. 16 to FIG. 20, for a change in a current magnitude of the inductor, a change in a capacitance magnitude, and a change in a voltage magnitude of the high-voltage power supply in each operation mode, refer to the waveform graph shown in FIG. 10. Details are not described again.

In addition, in the examples in FIG. 16 to FIG. 20, although each operation mode is described by using the example in which the voltage conversion circuit includes an inductor charging mode, a flying capacitor charging mode, and a boost discharging mode in one switching period, it should be understood that the voltage conversion circuit includes at least an inductor charging mode, a flying capacitor charging mode, and a boost discharging mode in one switching period. In other words, a quantity of each operation mode may be alternatively plural. To be specific, one operation mode occurs in a plurality of time periods, so that the operation mode is allocated more evenly, and current ripples of the inductor or voltage ripples of a capacitor in the operation mode can be reduced. For an exemplary description, refer to the foregoing description about the switching period. Details are not described herein again.

To be specific, for the control manner 1, one switching period may include at least one flying capacitor charging mode, and each flying capacitor charging mode is used to charge at least one flying capacitor in the N−1 flying capacitors. Correspondingly, in the boost discharging mode, the low-voltage power supply, the inductor, the at least one flying capacitor, and the high-voltage power supply form a closed loop, to discharge to the high-voltage power supply. For example, if the at least one flying capacitor includes a plurality of flying capacitors, the plurality of flying capacitors are connected in parallel in each flying capacitor charging mode and the boost discharging mode. A quantity of flying capacitors included in the at least one flying capacitor may be positively correlated with the magnitude of the current output by the low-voltage power supply.

Control manner 2: When the plurality of flying capacitors included in the voltage conversion circuit are flying capacitors with capacitance values that are gradually increased stage by stage, the voltage conversion circuit may be controlled to operate in the continuous conduction mode in the following manner: The flying capacitors are charged stage by stage, to gradually increase a voltage, and implement a higher boost ratio.

The voltage conversion circuit shown in FIG. 15 is still used as an example, to describe how to control the voltage conversion circuit to use different quantities of flying capacitors. The capacitance value of the flying capacitor $C_2$ is greater than the capacitance value of the flying capacitor $C_1$.

Figure 23:
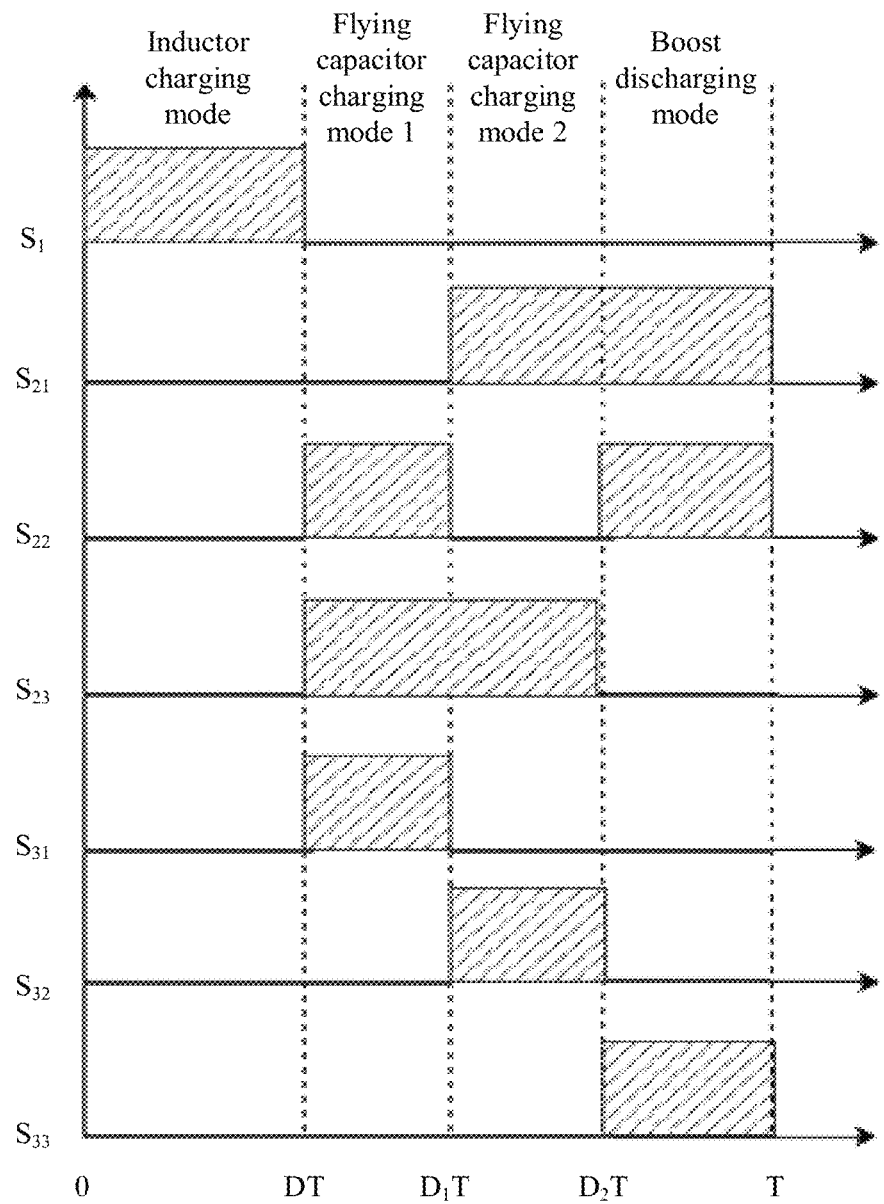
FIG. 23 is a schematic diagram of another switching sequence according to an embodiment of this application.

FIG. 23 is a schematic diagram of another switching sequence according to an embodiment of this application. As shown in FIG. 23, a control manner of the voltage conversion circuit shown in FIG. 15 in the continuous conduction mode is described by using an example in which the voltage conversion circuit includes an inductor charging mode, a flying capacitor charging mode 1, a flying capacitor charging mode 2, and a boost discharging mode in one switching period T.

Figure 24:
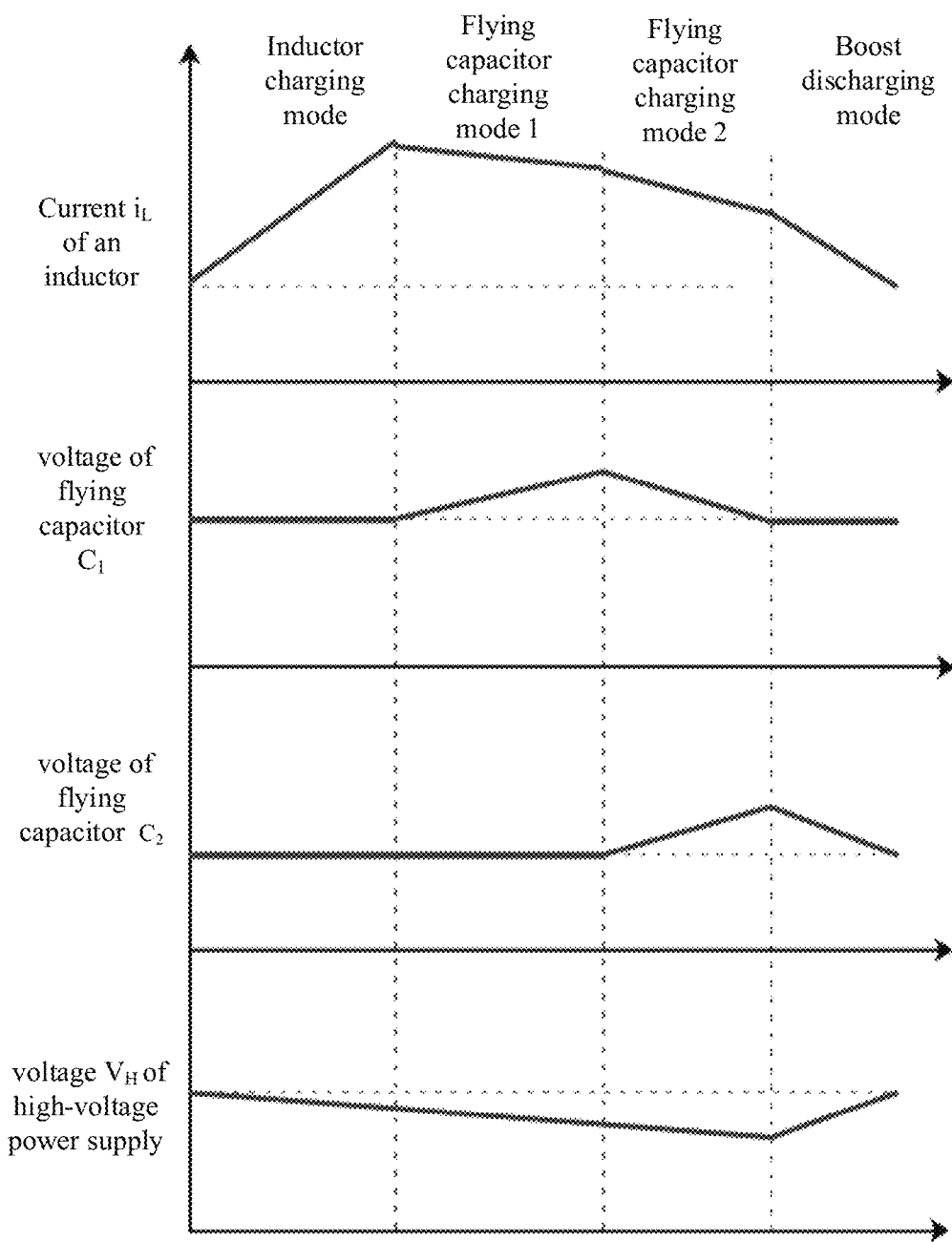
FIG. 24 is a schematic diagram of a parameter waveform according to an embodiment of this application.

Inductor charging mode: FIG. 24 is a schematic diagram of a parameter waveform according to an embodiment of this application. Refer to FIG. 23, FIG. 24, and FIG. 16. In a time period from 0 to DT, the first switch module $S_1$ is controlled to be closed, and the second switch modules $S_{21}$, $S_{22}$, and $S_{23}$ and the third switch modules $S_{31}$, $S_{32}$, and $S_{33}$ are all disconnected, so that the low-voltage power supply and the inductor are connected in series to form a closed loop, and the voltage conversion circuit enters the inductor charging mode to charge the inductor. During charging of the inductor, a current magnitude $i_L$ of the inductor increases.

In this case, because the flying capacitors $C_1$ and $C_2$ do not form the closed loop, voltage magnitudes of the flying capacitors $C_1$ and $C_2$ remain unchanged. In addition, because the voltage conversion circuit is in the continuous conduction mode, the high-voltage power supply still continuously discharges to an external load in the operation mode. Therefore, a voltage magnitude of the high-voltage power supply slightly decreases.

Flying capacitor charging mode 1: Refer to FIG. 23, FIG. 24, and FIG. 17. In a time period from DT to $D_1T$, the first switch module $S_1$, the second switch module $S_{21}$, and the third switch modules $S_{32}$ and $S_{33}$ are all controlled to be disconnected, and the second switch modules $S_{22}$ and $S_{23}$ and the third switch module $S_{31}$ are closed, so that the low-voltage power supply, the inductor, and the flying capacitor $C_1$ are connected in series to form a closed loop, and the voltage conversion circuit enters the flying capacitor charging mode 1 to charge the flying capacitor $C_1$. During charging of the flying capacitor $C_1$, a voltage magnitude of the flying capacitor $C_1$ increases.

In the operation mode, if a voltage magnitude of the low-voltage power supply is greater than the voltage magnitude of the flying capacitor $C_1$, the low-voltage power supply also charges the inductor while charging the flying capacitor $C_1$. Therefore, the current magnitude $i_L$ of the inductor increases. If the voltage magnitude of the low-voltage power supply is less than the voltage magnitude of the flying capacitor $C_1$, the low-voltage power supply and the inductor are connected in series to jointly charge the flying capacitor $C_1$. Therefore, the current magnitude $i_L$ of the inductor decreases. FIG. 24 is a schematic diagram of an example in which the current magnitude $i_L$ of the inductor decreases.

In this case, because the flying capacitor $C_2$ does not form the closed loop, a voltage magnitude of the flying capacitor $C_2$ remains unchanged. In addition, because the voltage conversion circuit is in the continuous conduction mode, the high-voltage power supply still continuously discharges to an external load in the operation mode. Therefore, a voltage magnitude of the high-voltage power supply slightly decreases.

Figure 21:
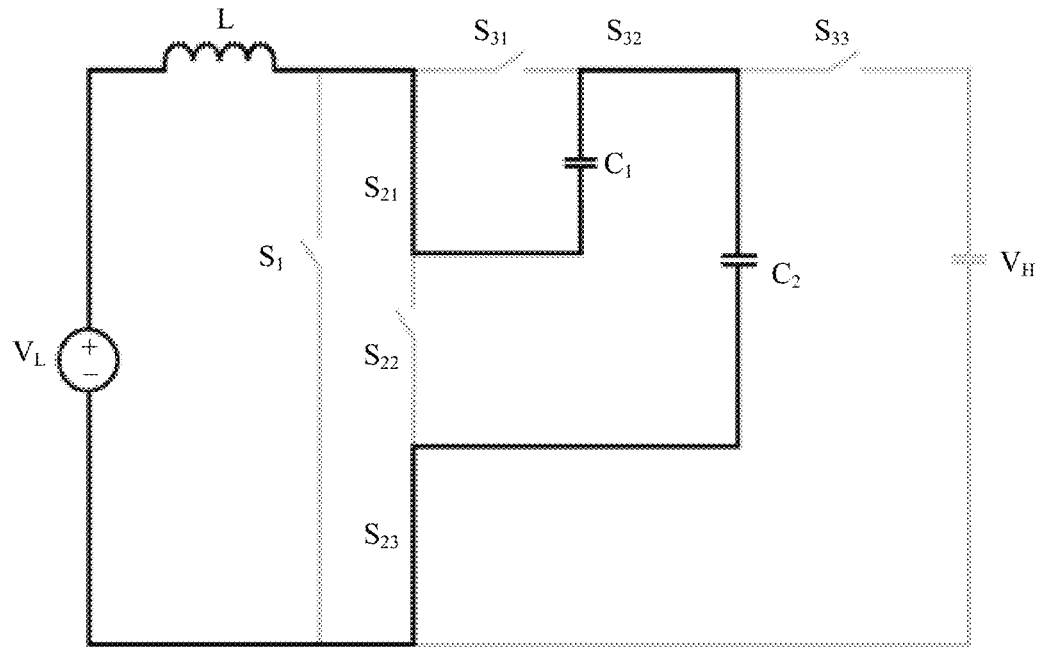
FIG. 21 is a schematic diagram 3 of a flying capacitor charging mode of yet another voltage conversion circuit according to an embodiment of this application.

Flying capacitor charging mode 2: FIG. 21 is a schematic diagram 3 of a flying capacitor charging mode of yet another voltage conversion circuit according to an embodiment of this application. Refer to FIG. 23, FIG. 24, and FIG. 21. In a time period from $D_1T$ to $D_2T$, the first switch module $S_1$, the second switch module $S_{22}$, the third switch modules $S_{31}$ and $S_{33}$ are all controlled to be disconnected, and the second switch modules $S_{21}$ and $S_{23}$ and the third switch module $S_{32}$ are closed, so that the low-voltage power supply, the inductor, the flying capacitor $C_1$, and the flying capacitor $C_2$ are connected in series to form a closed loop, and the voltage conversion circuit enters the flying capacitor charging mode 2.

In this case, the flying capacitor $C_1$ is reversely connected in series, to be specific, polarity in the serial loop formed in the flying capacitor charging mode 1 by the flying capacitor $C_1$ is opposite to polarity in the serial loop formed in the flying capacitor charging mode 2 by the flying capacitor $C_1$. Therefore, the low-voltage power supply, the inductor, and the flying capacitor $C_1$ jointly discharge to the flying capacitor $C_2$ after being connected in series. Therefore, the voltage magnitude of the flying capacitor $C_1$ decreases, and the voltage magnitude of the flying capacitor $C_2$ increases.

In the operation mode, if a voltage magnitude of the low-voltage power supply is greater than the voltage magnitude of the flying capacitor $C_2$, the low-voltage power supply also charges the inductor while charging the flying capacitor $C_2$. Therefore, the current magnitude $i_L$ of the inductor increases. If the voltage magnitude of the low-voltage power supply is less than the voltage magnitude of the flying capacitor $C_2$, the low-voltage power supply and the inductor are connected in series to jointly charge the flying capacitor $C_2$. Therefore, the current magnitude $i_L$ of the inductor decreases. FIG. 24 is a schematic diagram of an example in which the current magnitude $i_L$ of the inductor decreases.

In addition, because the voltage conversion circuit is in the continuous conduction mode, the high-voltage power supply still continuously discharges to an external load in the operation mode. Therefore, a voltage magnitude of the high-voltage power supply slightly decreases.

Figure 22:
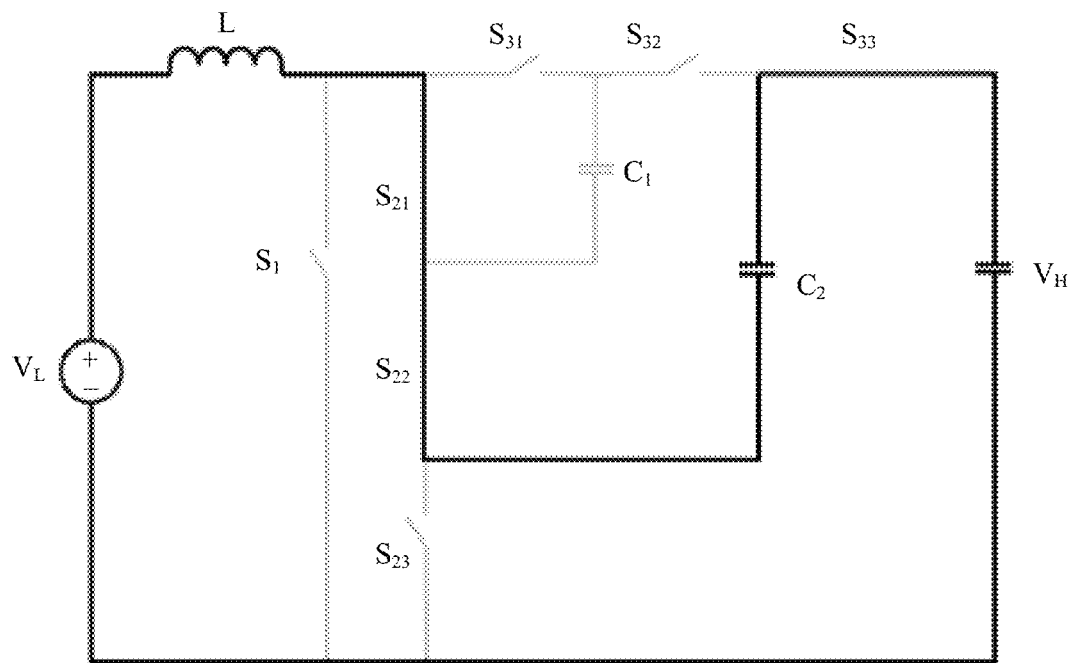
FIG. 22 is a schematic diagram 3 of a boost discharging mode of yet another voltage conversion circuit according to an embodiment of this application.

Boost discharging mode: FIG. 22 is a schematic diagram 3 of a boost discharging mode of yet another voltage conversion circuit according to an embodiment of this application. Refer to FIG. 23, FIG. 24, and FIG. 22. In a time period from $D_2T$ to $D_3T$, the first switch module $S_1$, the second switch module $S_{23}$, and the third switch modules $S_{31}$ and $S_{32}$ are all controlled to be disconnected, and the second switch modules $S_{21}$ and $S_{22}$ and the third switch module $S_{33}$ are closed, so that the low-voltage power supply, the inductor, the flying capacitor $C_2$, and the high-voltage power supply are connected in series to form a closed loop. In this case, the flying capacitor $C_2$ is reversely connected in series, to be specific, polarity in the serial loop formed in the boost discharging mode by the flying capacitor $C_2$ is opposite to polarity in the serial loop formed in the flying capacitor charging mode 2 by the flying capacitor $C_2$. Therefore, the low-voltage power supply, the inductor, and the flying capacitor $C_2$ jointly discharge to the high-voltage power supply after being connected in series. Therefore, the voltage magnitude of the flying capacitor $C_2$ decreases, the current magnitude of the inductor decreases, and the voltage magnitude of the high-voltage power supply increases.

In this case, because the flying capacitor $C_1$ does not form the closed loop, a voltage magnitude of the flying capacitor $C_1$ remains unchanged.

It can be learned from the descriptions of the foregoing examples that, for the control manner 2, manners for the voltage conversion circuit to enter the flying capacitor charging mode and the boost discharging mode are summarized as follows:

One switching period includes M flying capacitor charging modes, to charge the flying capacitors stage by stage by using the M flying capacitor charging modes to implement boost stage by stage, so that in the boost discharging mode, a high voltage can be provided for the high-voltage power supply, thereby implementing a higher boost ratio. M described herein may be an integer greater than 1 and less than or equal to N−1. For example, a value of M may be determined based on a required boost ratio, so that the voltage conversion circuit can adapt to devices or systems with different boost ratios.

It should be noted that from a perspective of the M flying capacitor charging modes and the boost discharging mode one by one, control of the switch modules is briefly described as follows: The second switch modules are sequentially turned off from top to bottom, and the third switch modules or units are sequentially turned on from left to right. For example, there are two flying capacitor charging modes. To be specific, in the flying capacitor charging mode 1, the first second switch module is disconnected, the remaining second switch modules are closed, the first third switch module is closed, and the remaining third switch modules are disconnected. In the flying capacitor charging mode 2, a second switch module is disconnected, the remaining second switch modules are closed, a second third switch module is closed, and the remaining third switch modules are disconnected. In the boost discharging mode, a third second switch module is disconnected, the remaining second switch modules are closed, a third switch module is closed, and the remaining third switch modules are disconnected.

In the control manner, according to the volt-second balance principle, the boost ratio $$\frac{V_H}{V_L}$$

of the voltage conversion circuit shown in FIG. 15 in the continuous conduction mode (that is, when power supply is not interrupted) is shown in the following formula (4):

$$\frac{V_H}{V_L} = \frac{M+1}{1-D} \quad (4)$$

D in the formula (4) refers to a duty cycle of the first switch module.

It can be seen from the formula (4) that the boost ratio of the voltage conversion circuit is at least twice that of the boost conversion circuit shown in FIG. 4. Therefore, when the voltage conversion circuit provided in this embodiment of this application and the boost conversion circuit shown in FIG. 4 are used in a same photovoltaic power generation system, compared with the boost conversion circuit shown in FIG. 4, in this embodiment of this application, a quantity of photovoltaic components connected in series in a photovoltaic string may be reduced by at least half, thereby reducing a risk caused by inconsistency and improving reliability of the photovoltaic string.

It should be understood that in the examples shown in the control manner 2, although each operation mode is described by using the example in which the voltage conversion circuit includes an inductor charging mode, a flying capacitor charging mode j (j is an integer less than or equal to M), and a boost discharging mode in one switching period, it should be understood that the voltage conversion circuit includes at least an inductor charging mode, a flying capacitor charging mode j, and a boost discharging mode in one switching period. In other words, a quantity of each operation mode may be alternatively plural. To be specific, one operation mode occurs in a plurality of time periods, so that the operation mode is allocated more evenly, and current ripples of the inductor or voltage ripples of a capacitor in the operation mode can be reduced. For an exemplary description, refer to the foregoing description about the switching period. Details are not described herein again.

To be specific, for the control manner 2, one switching cycle may include a plurality of flying capacitor charging modes, and the plurality of flying capacitor charging modes are used to charge a plurality of flying capacitors in the N−1 flying capacitors stage by stage, where each flying capacitor charging mode is used to charge one flying capacitor in the plurality of flying capacitors. Correspondingly, in the boost discharging mode, the low-voltage power supply, the inductor, a last-stage flying capacitor in the plurality of flying capacitors, and the high-voltage power supply form a closed loop, to discharge to the high-voltage power supply. For example, a quantity of the plurality of flying capacitors that participate in stage-by-stage charging may be related to the boost ratio of the voltage conversion circuit.

It should be noted that the voltage conversion circuit provided in embodiments of this application is described in the foregoing embodiments by using an example of how to implement boost by using the voltage conversion circuit. However, a person skilled in the art may understand that the voltage conversion circuit may be alternatively applied to any buck scenario. In a buck scenario, the voltage conversion circuit may buck a voltage input by the high-voltage power supply and provide a bucked voltage to the low-voltage power supply, to supply power to the low-voltage power supply.

An operation mode of the voltage conversion circuit in one switching period during buck implementation is just contrary to an operation mode of the voltage conversion circuit in one switching period during boost implementation. To be specific, the voltage conversion circuit includes a buck discharging mode, a flying capacitor discharging mode, and an inductor discharging mode.

In the buck discharging mode, the low-voltage power supply, the inductor, at least one flying capacitor in the N−1 flying capacitors, and the high-voltage power supply form a closed loop, so that the high-voltage power supply discharges to the at least one flying capacitor.

In the flying capacitor discharging mode, the low-voltage power supply, the inductor, and the at least one flying capacitor in the N−1 flying capacitors form a closed loop, to charge the inductor.

In the inductor discharging mode, the low-voltage power supply and the inductor form a closed loop, so that the inductor discharges to the low-voltage power supply.

For a method for controlling the voltage conversion circuit to implement buck, refer to the method in which the voltage conversion circuit implements boost. Implementation principles of buck and boost are similar, and details are not described again.

According to another aspect, an embodiment of this application further provides a power supply system. The power supply system includes a low-voltage power supply, a high-voltage power supply, and the voltage conversion circuit shown in the foregoing embodiments. For a connection relationship among the low-voltage power supply, the high-voltage power supply, and the voltage conversion circuit, and corresponding technical effects, refer to the descriptions in the foregoing embodiments. Details are not described herein again.

It should be understood that the power supply system described herein may be, for example, a new energy power supply system with a direct current characteristic, for example, a photovoltaic power generation system, a battery, or a fuel cell, or may be another power supply system that supplies power by using an energy harvesting technology. For example, the power supply system is the photovoltaic power generation system shown in FIG. 1 or FIG. 2.

That the power supply system is a photovoltaic power generation system is used as an example. The power supply system includes a plurality of power generation units and a high-voltage power supply. Each power generation unit includes a low-voltage power supply and the voltage conversion circuit shown in the foregoing embodiments.

For example, the low-voltage power supply is a photovoltaic string, and the high-voltage power supply is a direct current bus. The power supply system further includes an inverter. A positive electrode of the direct current bus is connected to a first input terminal of the inverter, a negative electrode of the direct current bus is connected to a second input terminal of the inverter, and an output terminal of the inverter is connected to an alternating current load. For example, the power supply system is the photovoltaic power generation system shown in FIG. 1.

For example, the low-voltage power supply is a photovoltaic string, and the high-voltage power supply is a direct current load. For example, the power supply system is the photovoltaic power generation system shown in FIG. 2.

It should be understood that, in exemplary implementation, the power supply system may further cover another component, device, or circuit, for example, an MPPT control circuit, based on a function required by the power supply system. Details are not described in this application again.

The foregoing descriptions are merely exemplary implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A voltage conversion circuit, comprising:
an inductor;
a first switch module;
N second switch modules connected in series;
N third switch modules connected in series; and
N−1 flying capacitors, wherein N is an integer greater than or equal to 2;
wherein one terminal of the first switch module is separately connected to one terminal of the N second switch modules connected in series and one terminal of the N third switch modules connected in series, the other terminal of the N third switch modules connected in series is connected to a positive electrode of a high-voltage power supply, the other terminal of the first switch module and the other terminal of the N second switch modules connected in series are connected to a negative electrode of the high-voltage power supply, and a low-voltage power supply is connected to the two terminals of the first switch module through the inductor;
wherein one terminal of an $i^{th}$ flying capacitor in the N−1 flying capacitors is connected to a connection point between an $i^{th}$ second switch module and an $(i+1)^{th}$ second switch module, the other terminal of the $i^{th}$ flying capacitor is connected to a connection point between an $i^{th}$ third switch module and an $(i+1)^{th}$ third switch module, and i is an integer greater than or equal to 1 and less than or equal to N−1;
wherein in one switching period, the circuit performs boost conversion on a voltage output by the low-voltage power supply, by using at least one flying capacitor charging mode and a boost discharging mode; and
wherein at least one flying capacitor comprises a plurality of flying capacitors, the plurality of flying capacitors are connected in parallel in each flying capacitor charging mode and the boost discharging mode.

2. The circuit according to claim 1, wherein a positive electrode of the low-voltage power supply is connected to one terminal of the first switch module through the inductor, and a negative electrode of the low-voltage power supply is connected to the other terminal of the first switch module.

3. The circuit according to claim 1, wherein the inductor is located in between a negative electrode of the low-voltage power supply and one end of the first switch module, and a positive electrode of the low-voltage power supply is connected to the other end of the first switch module.

4. The circuit according to claim 1, wherein in the one switching period, the circuit performs, by further using an inductor charging mode, the boost conversion on the voltage output by the low-voltage power supply,
wherein
in the inductor charging mode, the low-voltage power supply and the inductor form a closed loop, to charge the inductor;
wherein in each flying capacitor charging mode, the low-voltage power supply, the inductor, and the at least one flying capacitor in the N−1 flying capacitors form a closed loop, to charge the at least one flying capacitor; and
wherein in the boost discharging mode, the low-voltage power supply, the inductor, one or more flying capacitors in the at least one flying capacitor, and the high-voltage power supply form a closed loop, to discharge the high-voltage power supply.

5. The circuit according to claim 4, wherein each operation mode occurs at least once in one switching period.

6. The circuit according to claim 5, wherein each flying capacitor charging mode is used to charge the at least one flying capacitor in the N−1 flying capacitors; and
in the boost discharging mode, the low-voltage power supply, the inductor, the at least one flying capacitor, and the high-voltage power supply form a closed loop, to discharge the high-voltage power supply.

7. The circuit according to claim 6, wherein a quantity of flying capacitors in the at least one flying capacitor is positively correlated with a magnitude of a current output by the low-voltage power supply.

8. The circuit according to claim 5, wherein capacitance values of the N−1 flying capacitors are increased stage by stage;
wherein the one switching period comprises a plurality of flying capacitor charging modes, the plurality of flying capacitor charging modes are used to charge a plurality of flying capacitors in the N−1 flying capacitors stage by stage, and each flying capacitor charging mode is used to charge one flying capacitor in the plurality of flying capacitors; and
wherein in the boost discharging mode, the low-voltage power supply, the inductor, a last-stage flying capacitor in the plurality of flying capacitors, and the high-voltage power supply form a closed loop, to discharge the high-voltage power supply.

9. The circuit according to claim 8, wherein a quantity of the plurality of flying capacitors is in relation to a boost ratio of the voltage conversion circuit.

10. A voltage conversion circuit, comprising:
an inductor;
a first switch module;
two second switch modules connected in series;
two third switch modules connected in series; and
a flying capacitor, wherein
one terminal of the first switch module is separately connected to one terminal of the two second switch modules connected in series and one terminal of the two third switch modules connected in series, the other terminal of the two third switch modules connected in series is connected to a positive electrode of a high-voltage power supply, the other terminal of the first switch module and the other terminal of the two second switch modules connected in series are connected to a negative electrode of the high-voltage power supply, and a low-voltage power supply is connected to the two terminals of the first switch module through the inductor;
wherein one terminal of the flying capacitor is connected to a connection point between a first second switch module and a second switch module, and the other terminal of the flying capacitor is connected to a connection point between a first third switch module and a second third switch module;
wherein in one switching period, the circuit performs boost conversion on a voltage output by the low-voltage power supply, by using at least one flying capacitor charging mode and a boost discharging mode; and
wherein at least one flying capacitor comprises a plurality of flying capacitors, the plurality of flying capacitors are connected in parallel in each flying capacitor charging mode and the boost discharging mode.

11. The circuit according to claim 10, wherein a positive electrode of the low-voltage power supply is connected to one terminal of the first switch module through the inductor, and a negative electrode of the low-voltage power supply is connected to the other terminal of the first switch module.

12. The circuit according to claim 10, wherein the inductor is located in between a negative electrode of the low-voltage power supply and one end of the first switch module, and a positive electrode of the low-voltage power supply is connected to the other end of the first switch module.

13. The circuit according to claim 10, wherein in the one switching period, the circuit performs, by further using an inductor charging mode, boost conversion on a voltage output by the low-voltage power supply:
wherein
in the inductor charging mode, the low-voltage power supply and the inductor form a closed loop, to charge the inductor;
wherein in each flying capacitor charging mode, the low-voltage power supply, the inductor, and the at least one flying capacitor in the N−1 flying capacitors form a closed loop, to charge the at least one flying capacitor; and
wherein in the boost discharging mode, the low-voltage power supply, the inductor, one or more flying capacitors in the at least one flying capacitor, and the high-voltage power supply form a closed loop, to discharge the high-voltage power supply.

14. The circuit according to claim 13, wherein each operation mode occurs at least once in one switching period.

15. The circuit according to claim 14, wherein each flying capacitor charging mode is used to charge the at least one flying capacitor in the N−1 flying capacitors; and
in the boost discharging mode, the low-voltage power supply, the inductor, the at least one flying capacitor, and the high-voltage power supply form a closed loop, to discharge the high-voltage power supply.

16. A power supply system, comprising:
a plurality of power generation units; and
a high-voltage power supply, and
wherein each power generation unit comprises a low-voltage power supply and a voltage conversion circuit, wherein the voltage conversion circuit comprises an inductor, a first switch module, N second switch modules connected in series, N third switch modules connected in series, and N−1 flying capacitors, wherein N is an integer greater than or equal to 2;

wherein one terminal of the first switch module is separately connected to one terminal of the N second switch modules connected in series and one terminal of the N third switch modules connected in series, the other terminal of the N third switch modules connected in series is connected to a positive electrode of a high-voltage power supply, the other terminal of the first switch module and the other terminal of the N second switch modules connected in series are connected to a negative electrode of the high-voltage power supply, and a low-voltage power supply is connected to the two terminals of the first switch module through the inductor;

wherein one terminal of an $i^{th}$ flying capacitor in the N−1 flying capacitors is connected to a connection point between an $i^{th}$ second switch module and an $(i+1)^{th}$ second switch module, the other terminal of the $i^{th}$ flying capacitor is connected to a connection point between an $i^{th}$ third switch module and an $(i+1)^{th}$ third switch module, and i is an integer greater than or equal to 1 and less than or equal to N−1;

wherein in one switching period, the circuit performs boost conversion on a voltage output by the low-voltage power supply, by using at least one flying capacitor charging mode and a boost discharging mode; and wherein at least one flying capacitor comprises a plurality of flying capacitors, the plurality of flying capacitors are connected in parallel in each flying capacitor charging mode and the boost discharging mode.

17. The system according to claim 16, wherein a positive electrode of the low-voltage power supply is connected to one terminal of the first switch module through the inductor, and a negative electrode of the low-voltage power supply is connected to the other terminal of the first switch module.

18. The system according to claim 16, wherein the inductor is located in between a negative electrode of the low-voltage power supply and one end of the first switch module, and a positive electrode of the low-voltage power supply is connected to the other end of the first switch module.

19. The system according to claim 16, wherein the low-voltage power supply is a photovoltaic string, and the high-voltage power supply is a direct current bus; and the power supply system further comprises an inverter, wherein a positive electrode of the direct current bus is connected to a first input terminal of the inverter, a negative electrode of the direct current bus is connected to a second input terminal of the inverter, and an output terminal of the inverter is connected to an alternating current load.

20. The system according to claim 16, wherein the low-voltage power supply is a photovoltaic string, and the high-voltage power supply is a direct current load.

* * * * *